US006151053A

United States Patent [19]
Watanabe et al.

[11] Patent Number: 6,151,053
[45] Date of Patent: Nov. 21, 2000

[54] IMAGE FORMATION WITH CONTROLLED SCANNING

[75] Inventors: Nobuyuki Watanabe; Shinobu Arimoto, both of Yokohama; Tsunao Hombo, Kawasaki; Junichi Noguchi, Yokohama, all of Japan

[73] Assignee: Canon Kabushiki Kaisha, Tokyo, Japan

[21] Appl. No.: 08/847,754

[22] Filed: Apr. 23, 1997

[30] Foreign Application Priority Data

| Apr. 25, 1996 | [JP] | Japan | 8-105386 |
| Apr. 25, 1996 | [JP] | Japan | 8-105401 |
| Sep. 3, 1996 | [JP] | Japan | 8-232968 |

[51] Int. Cl.⁷ .......................... B41J 2/385; G03G 15/01; G01D 15/06
[52] U.S. Cl. .......................................... 347/115
[58] Field of Search .................. 347/243, 244, 347/260, 261, 252, 232, 235, 250, 15, 116, 144, 129, 135; 399/28, 41, 53, 178, 184, 223, 298, 301; 358/296

[56] References Cited

U.S. PATENT DOCUMENTS

| 5,264,870 | 11/1993 | Egawa | 346/108 |
| 5,634,171 | 5/1997 | Muto | 399/32 |
| 5,638,191 | 6/1997 | Torisawa et al. | 358/502 |

Primary Examiner—John Barlow
Assistant Examiner—Raquel Yvette Gordon
Attorney, Agent, or Firm—Fitzpatrick, Cella, Harper & Scinto

[57] ABSTRACT

It is provided an image formation apparatus which forms a color image by superimposing an image corresponding to each of plural-color image data on an image support body, comprises a light beam generation means for generating a light beam which has been modulated according to each-color image data included in the plural-color image data, a rotation polygon mirror for performing scanning on a photosensitive body by using the light beam, a position signal generation means for outputting a position signal representing a scanning position on the photosensitive body, in case of performing the scanning on the photosensitive body by using the light beam corresponding to first-color image data included in the plural-color image data, and a control means for controlling rotation driving of the rotation polygon mirror corresponding to second and subsequent colors, in response to the position signal. Therefore, it can be obtained a new method for superimposing plural-color plane images without aberration in position, in case of forming a color image by superimposing the plural-color plane images on the image support body such as the photosensitive body, an intermediate transfer body, a recording paper on a transfer body or the like.

15 Claims, 19 Drawing Sheets

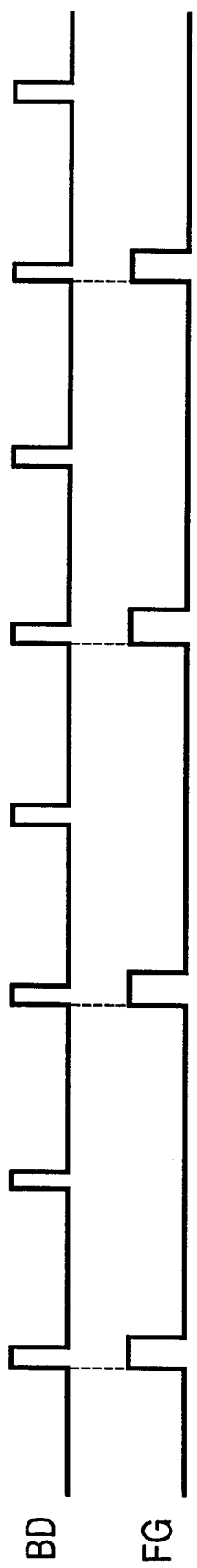
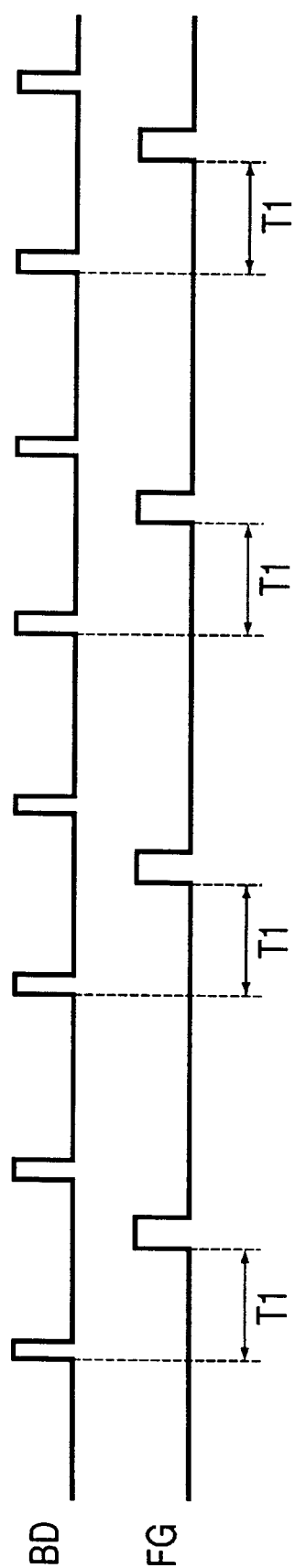
FIG. 17A
FIG. 17B

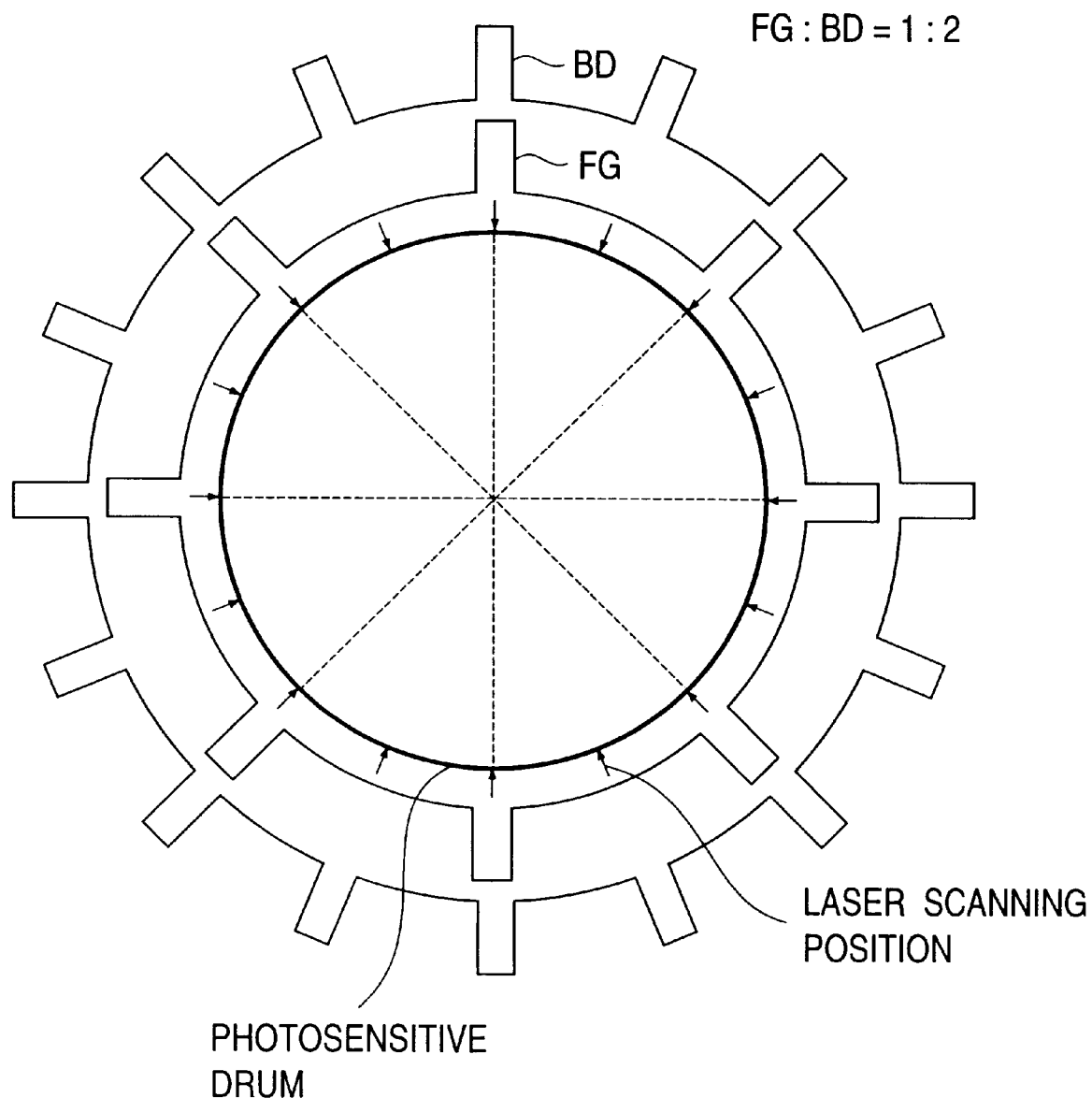

IMAGE FORMATION WITH CONTROLLED SCANNING

BACKGROUND OF THE INVENTION

1. Field of the Invention

The present invention relates to an image formation apparatus which forms an image.

2. Related Background Art

Conventionally, as an image formation apparatus which forms a color image by superimposing plural-color plane images, it has been known the color image formation apparatus such as an LBP (laser beam printer) in which a laser beam is reflected on a rotation polyhedron (i.e., polygon mirror), a photosensitive body is scanned by using the reflected laser beam to form a latent image for each line on the photosensitive body, the plane image of each color is formed by using each of M (magenta), C (cyan), Y (yellow) and BK (black) development agents on the basis of the formed latent image, and then the formed plane images are superimposed on a recording paper (or sheet) fixed on a transfer drum to form the color image.

Further, it has been also known the image formation apparatus in which the each-color plane image formed on the photosensitive body is one superimposed on an intermediate transfer body, and then the superimposed color images on the intermediate transfer body are collectively transferred onto the recording paper.

Furthermore, it has been also known the image formation apparatus in which the each-color plane image is superimposed on the photosensitive body, and then the superimposed color images are collectively transferred onto the recording paper.

In such a conventional color image formation technique, in order to prevent deterioration in color image quality due to aberration or displacement of a superimposing position of the each-color image, it gradually increases in necessity for controlling the positions when the each-color image is superimposed.

For example, U.S. Pat. No. 5,264,870 provides the structure in which the photosensitive body and a polygon motor are driven in response to the same reference signal, and the number of planes of the polygon mirror is set to be the same as the number of FG (frequency generator) pulses for each rotation of the polygon mirror. According to such the structure, even if the photosensitive body rotates many times, the scanning line by the laser beam can always trace the same position or line, whereby the plural-color plane images can be superimposed without any aberration or displacement.

However, in a case where the color image is formed by superimposing the plural-color plane images on an image support body such as the photosensitive body, the intermediate transfer body, the recording paper on the transfer body or the like, it is not yet established a method for superimposing such the plural-color plane images without any aberration or displacement.

Conventionally, in a case where movement of the image support body and rotation of a polygon scanner are respectively controlled on the basis of the reference signals which are output respectively from different oscillators, it is necessary a complicated control system for performing control such that a phase of an ITOP (image top) signal representing an image writing start position and a phase of a BD (beam detect) signal representing a rotation timing of the polygon scanner are coincided with each other, i.e., a phase in a main-scanning direction (rotation direction of polygon scanner) and a phase in a sub-scanning direction (movement direction of image support body) are coincided with each other. Therefore, it has been occurred a problem that a cost in manufacturing the apparatus raises.

Further, in a case where the polygon mirror rotates at high speed in a high-speed printer or the like, numbers of FG pulses are generated. In such the case, if the number of planes of the polygon mirror is set to be the same as the number of FG pulses such as in U.S. Pat. No. 5,264,870, a frequency of the FG pulse becomes high. Therefore, it is occurred a problem that it is difficult to control the rotation of the polygon mirror on the basis of the FG pulse.

SUMMARY OF THE INVENTION

The present invention has been made in consideration of the above-described problems. A main object of the present invention is to provide a new method for superimposing plural-color plane images without aberration or displacement in position, in case of forming a color image by superimposing the plural-color plane images on an image support body such as a photosensitive body, an intermediate transfer body, a recording paper on a transfer body or the like.

In order to achieve the above object, according to one preferred embodiment of the present invention, it is provided an image formation apparatus which forms the color image by superimposing an image corresponding to each of plural-color image data on the image support body, comprising:

light beam generation means for generating a light beam which has been modulated according to each-color image data included in the plural-color image data;

a rotation polygon mirror for performing scanning on the photosensitive body by using the light beam;

position signal generation means for outputting a position signal representing a scanning position on the photosensitive body, in case of performing the scanning on the photosensitive body by using the light beam corresponding to first-color image data included in the plural-color image data; and control means for controlling rotation driving of the rotation polygon mirror corresponding to second and subsequent colors, in response to the position signal.

An another object of the present invention is to provide an image formation apparatus in which, by constantly maintaining a phase difference occurred between a case where a rotation polyhedron on which plane images are formed is driven in a main-scanning direction and a case where an image support body is driven in a sub-scanning direction, plural-color plane images can be superimposed without aberration or displacement in position when superimposing the plural-color plane images.

In order to achieve the above object, according to one preferred embodiment of the present invention, it is provided the image formation apparatus comprising:

light beam generation means for generating a light beam which has been modulated according to image data;

a rotation polygon mirror having n reflection planes, for performing scanning on a photosensitive body by reflecting the light beam with rotation;

rotation pulse generation means for generating m pulses during the rotation polygon mirror rotates one time;

clock generation means for generating a reference clock used for controlling a phase of the rotation polygon mirror, on the basis of a position of the photosensitive body; and control means for controlling the rotation of the rotation polygon mirror on the basis of the pulse generated by the rotation pulse generation means and the reference clock generated by the clock generation means.

Still another object of the present invention is to provide an image formation apparatus in which, in case of forming a color image by superimposing plural-color plane images, the number of planes of a rotation polyhedron (i.e., rotation polygon mirror) or the like can be freely designed as compared with conventional one and the plural-color plane images can be superimposed without aberration or displacement in position.

In order to achieve the above object, according to one preferred embodiment of the present invention, it is provided the image formation apparatus for forming the color image by using a plurality of colors, comprising:

clock signal generation means for generating a reference clock signal;

the rotation polygon mirror for performing scanning on a predetermined image support body, by using a light beam based on image data;

first driving means for rotatively driving the rotation polygon mirror;

second driving means for rotatively driving the image support body;

control pulse generation means for generating control pulses corresponding to 1/(an integer equal to or larger than 2 and also corresponding to the number of planes of the rotation polygon mirror), during the rotation polygon mirror rotates one time;

first control means for controlling the rotative driving by the first driving means, on the basis of the control pulse generated by the control pulse generation means and the reference clock signal generated by the clock signal generation means; and second control means for controlling the rotative driving by the second driving means on the basis of the reference clock signal generated by the clock signal generation means.

The above and other objects of the present invention will become apparent from the following detailed description when read in conjunction with the accompanying drawings.

BRIEF DESCRIPTION OF THE DRAWINGS

FIGS. 17A and 17B are timing charts respectively showing the FG pulse and the BD signal;

FIG. 19 is a diagram showing relation of the FG pulse and the BD signal on a photosensitive drum.

DETAILED DESCRIPTION OF THE PREFERRED EMBODIMENTS

FIRST EMBODIMENT

Figure 1:
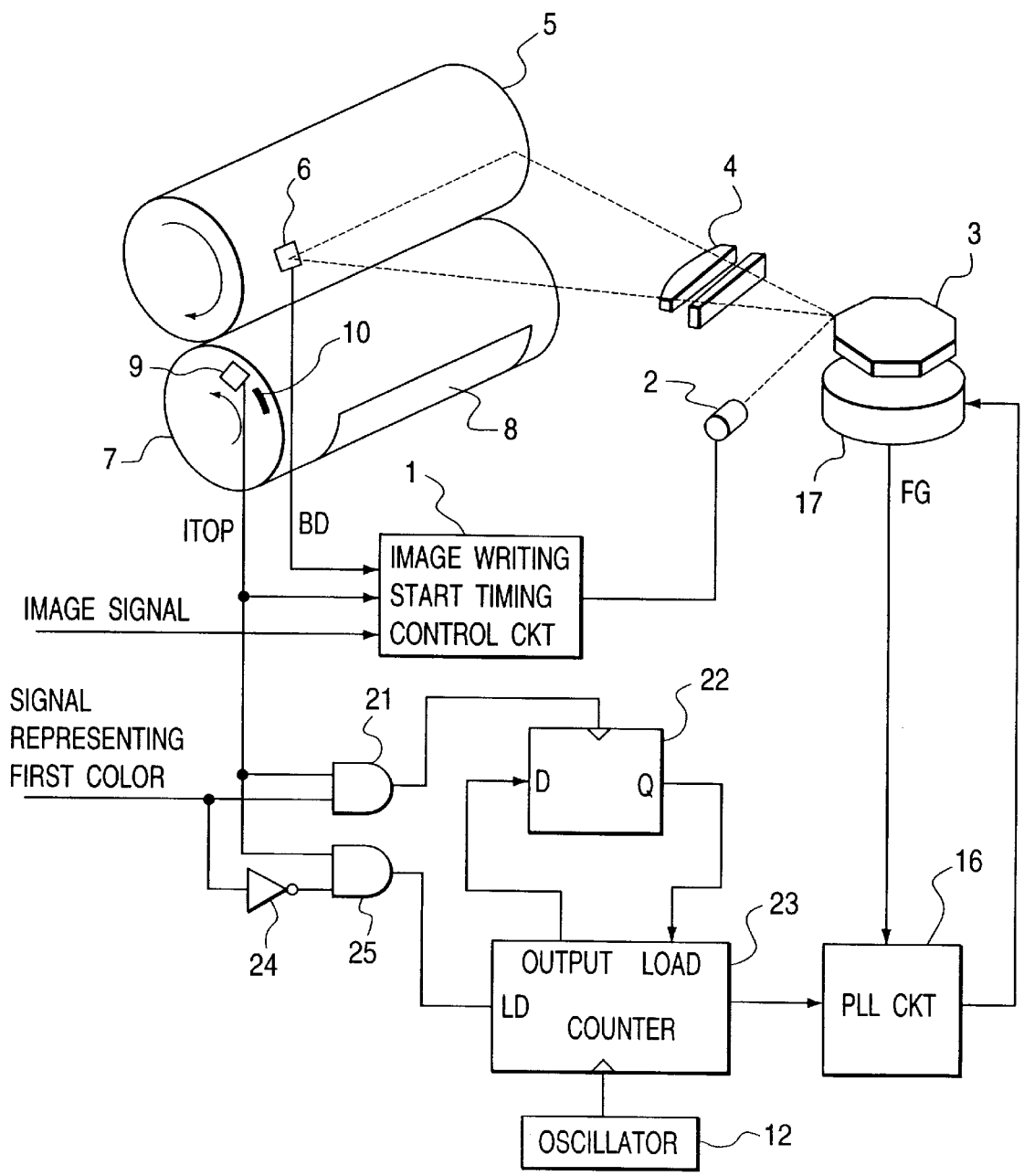
FIG. 1 is a diagram showing the structure of a color image formation apparatus according to a first embodiment of the present invention.
Figure 2:
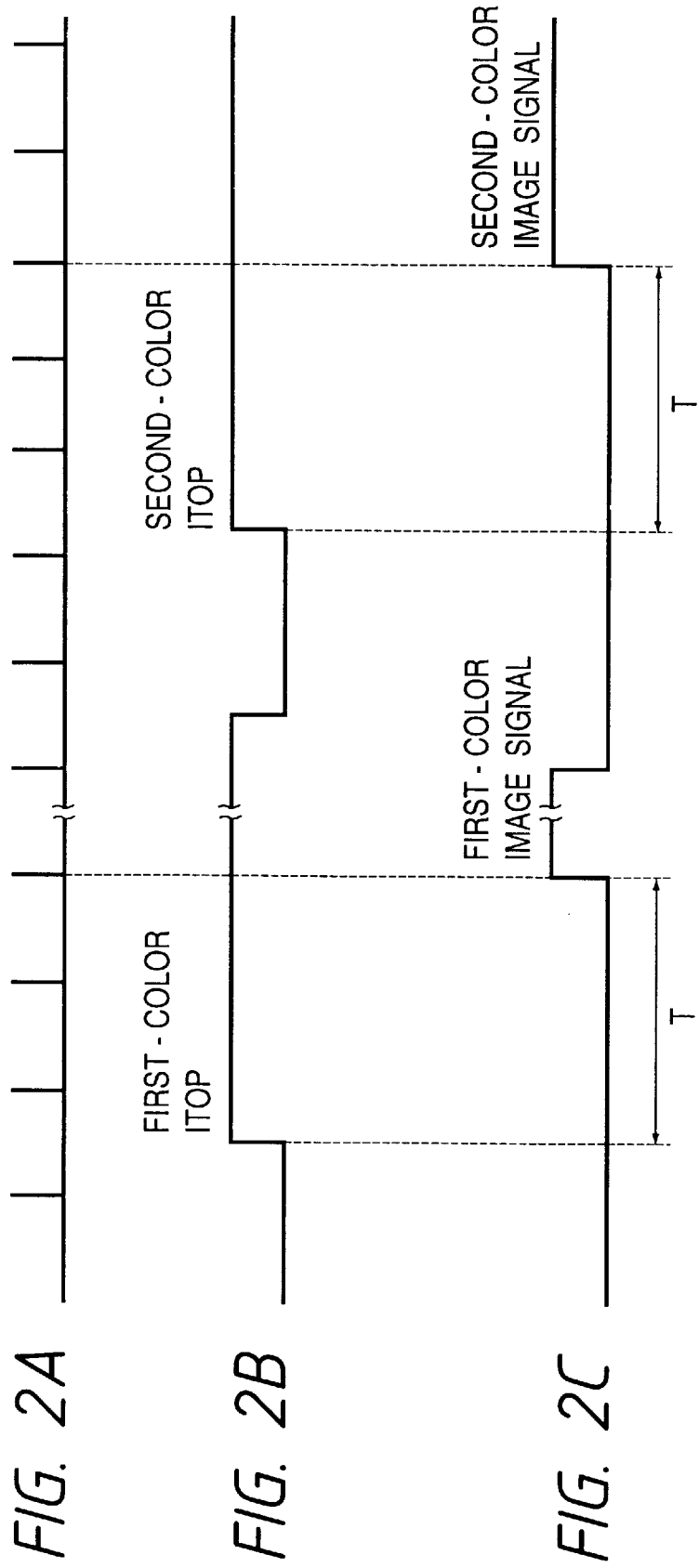
FIGS. 2A, 2B and 2C are timing charts showing respective signals in the first embodiment.

FIG. 1 is a diagram showing the structure of a color image formation apparatus according to the first embodiment of the present invention, and FIGS. 2A to 2C are timing charts. In FIG. 1, an image signal which is input from an external apparatus such as an image scanner, a computer or the like is input into an image writing start timing control circuit 1.

The image writing start timing control circuit 1 performs modulation driving of a semiconductor laser 2 in response to M (magenta), C (cyan), Y (yellow) and BK (black) image signals. A laser beam generated from the semiconductor laser 2 is reflected on a rotating polygon mirror 3 and subjected to fθ correction by an f-θ lens 4, and then scanning is performed on a photosensitive drum 5 by using the corrected laser beam. As a result, an electrostatic latent image is formed on the photosensitive drum 5.

A BD (beam detect) sensor 6 is provided near a scanning start position of one line by the laser beam to detect line scanning of the laser beam. Then, the BD sensor 6 generates a scanning start reference signal (i.e., BD signal) for each line shown in FIG. 2A. Further, M, C, Y and BK development units (all not shown) are provided around the photosensitive drum 5. These four development units are alternatively contacted to the photosensitive drum 5 during the drum 5 rotates four times, to perform development by using toners corresponding to the C, M, Y and BK electrostatic latent images formed on the photosensitive drum 5. Toner images developed by the development units are transferred onto a recording paper (or sheet) 8 wound around a transfer drum 7. In the transfer drum 7, a sensor 9 is provided to generate an ITOP (image top) signal representing a leading position of the recording paper 8 on the transfer drum 7. When the transfer drum 7 rotates and thus a flag 10 fixed within the transfer drum 7 passes through the sensor 9, the ITOP signal shown in FIG. 2B is generated.

The photosensitive drum 5 is rotatively driven in a direction indicated by an arrow by a photosensitive drum driving motor (not shown). The transfer drum 7 is mechanically connected to the photosensitive drum 5 through a gear, whereby the transfer drum 7 is rotatively driven in a direction indicated by an arrow in synchronism with the photosensitive drum 5 at the same speed. Therefore, the sensor 9 and the flag 10 within the transfer drum 7 may be provided within the photosensitive drum 5. The BD signal and the ITOP signal are input into the image writing start timing control circuit 1, and the image signal is transferred to the semiconductor 2, e.g., at a following timing. That is, in case of elapsing a predetermined time T after detecting a rise of the ITOP signal, the image signal is irradiated onto the photosensitive drum 5 as a laser modulation beam in synchronism with a rise of the BD signal as shown in FIG. 2C.

Figure 6:
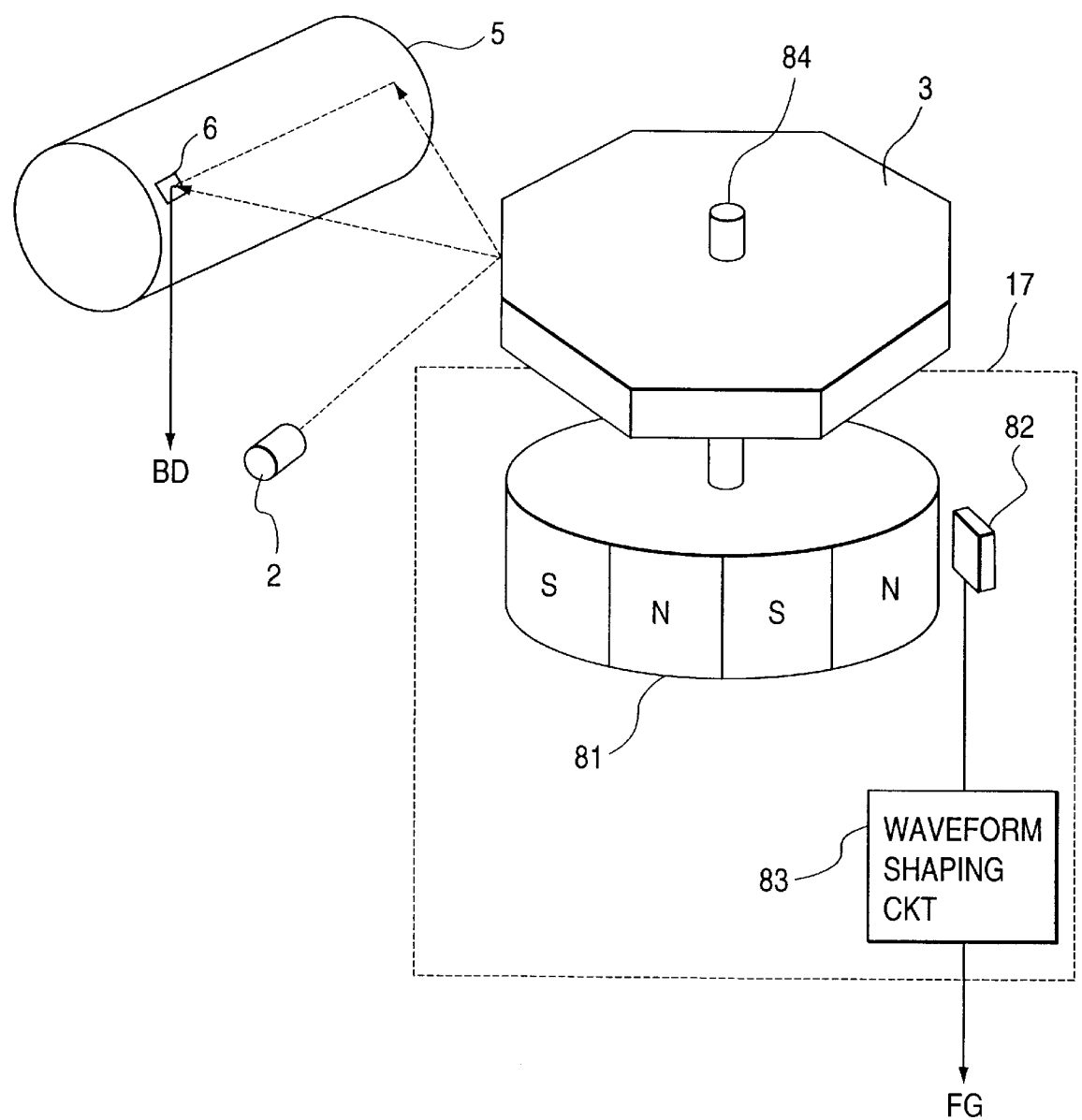
FIG. 6 is a diagram showing the internal structure of a polygon motor in the first embodiment.

FIG. 6 is a diagram showing the structure of a polygon motor 17. In the present embodiment, it is assumed that the polygon mirror 3 having eight planes (or surfaces) is used. An FG (frequency generator) pulse is generated by an FG sensor 82 and an FG waveform shaping circuit 83. The four FG pulses are output per one rotation of the polygon motor 17, whereby the two BD signal are output during the one FG pulse is output. Reference numeral 81 denotes a rotor of the polygon motor 17. The rotor 81 has a permanent magnet on which four pairs of pole patterns (corresponding to one rotation of rotor 81) are polarized.

Further, the polygon mirror 3 is fixed through a spindle 84 which is also fixed to the rotor 81. When the polygon motor 17 rotates, the FG sensor 82 generated four pulses per one rotation from the pole patterns polarized on the rotor 81. The generated pulses are subjected to waveform shaping by the FG waveform shaping circuit 83, and then the FG pulses are output.

On the other hand, the laser beam illuminated by the semiconductor laser 2 is used to perform the scanning on the photosensitive drum 5 by the polygon mirror 3 which rotates identically with the polygon motor 17. Then, the BD sensor 6 outputs the BD signal, i.e., the reference signal in the main-scanning direction.

Figure 5A:
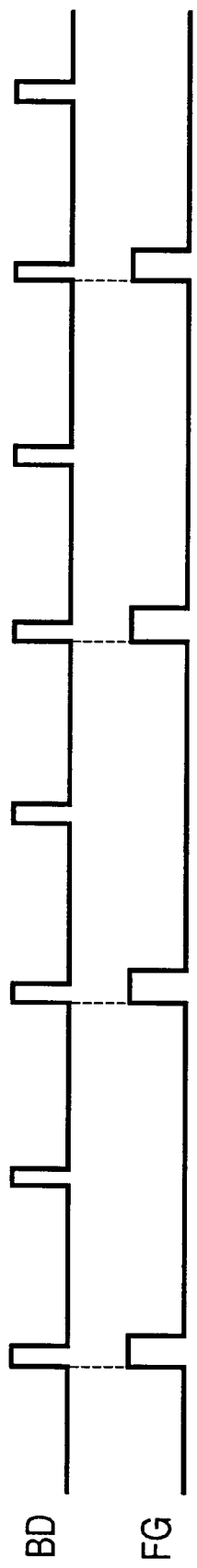
FIGS. 5A and 5B are timing charts respectively showing an FG (frequency generator) pulse and a BD (beam detect) signal.
Figure 5B:
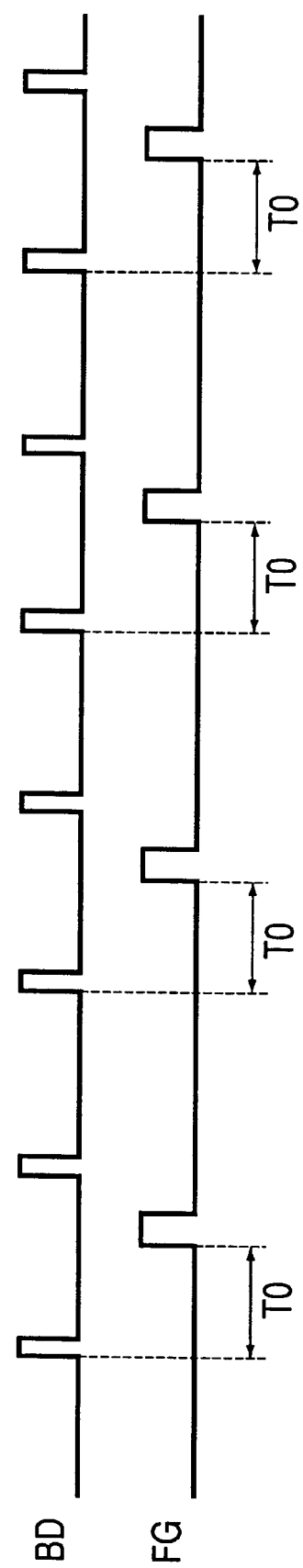

FIGS. 5A and 5B are timing charts for explaining relation between the BD signal and the FG pulse. In the present embodiment, the polygon mirror has the eight planes and the pole patterns of the rotor 81 generate four pulses per one rotation, whereby the one FG pulse is output during the two BD signals are output.

Further, as described above, since the rotor 81 and the polygon mirror 3 are fixed to each other, the rotor 81 and the polygon mirror 3 rotate identically, whereby the BD signal which has surely a phase difference time T0 in respect of the FG pulse is generated as shown in FIG. 5B. Such the phase difference time T0 changes only due to an initial attachment angle of the polygon mirror 3 onto the polygon motor 17. Therefore, when the polygon mirror 3 is once attached to the motor 17 and fixed, the phase difference time T0 does not change.

Therefore, according to the attachment angle, the phase difference can be made zero as shown in FIG. 5A. When the phase difference between the BD signal and the FD pulse is always constant, such the phase difference may be either zero or T0.

The feature of the present embodiment is to control rotation of the polygon motor such that a rotation position of the rotor 81 when a first-color ITOP signal is risen becomes identical to the rotation position of the rotor 81 when second- and subsequent-color ITOP signals are risen. Hereinafter, a concrete example will be explained.

In FIG. 1, a counter 23 counts clocks which are output from an oscillator 12. The counter 23 sends to a PLL (phase-locked loop) circuit 16 a motor driving pulse which becomes an H level when counting a predetermined number (e.g., 128 pulses) of clocks and becomes an L level when further counting the same number of clocks.

Figure 7:
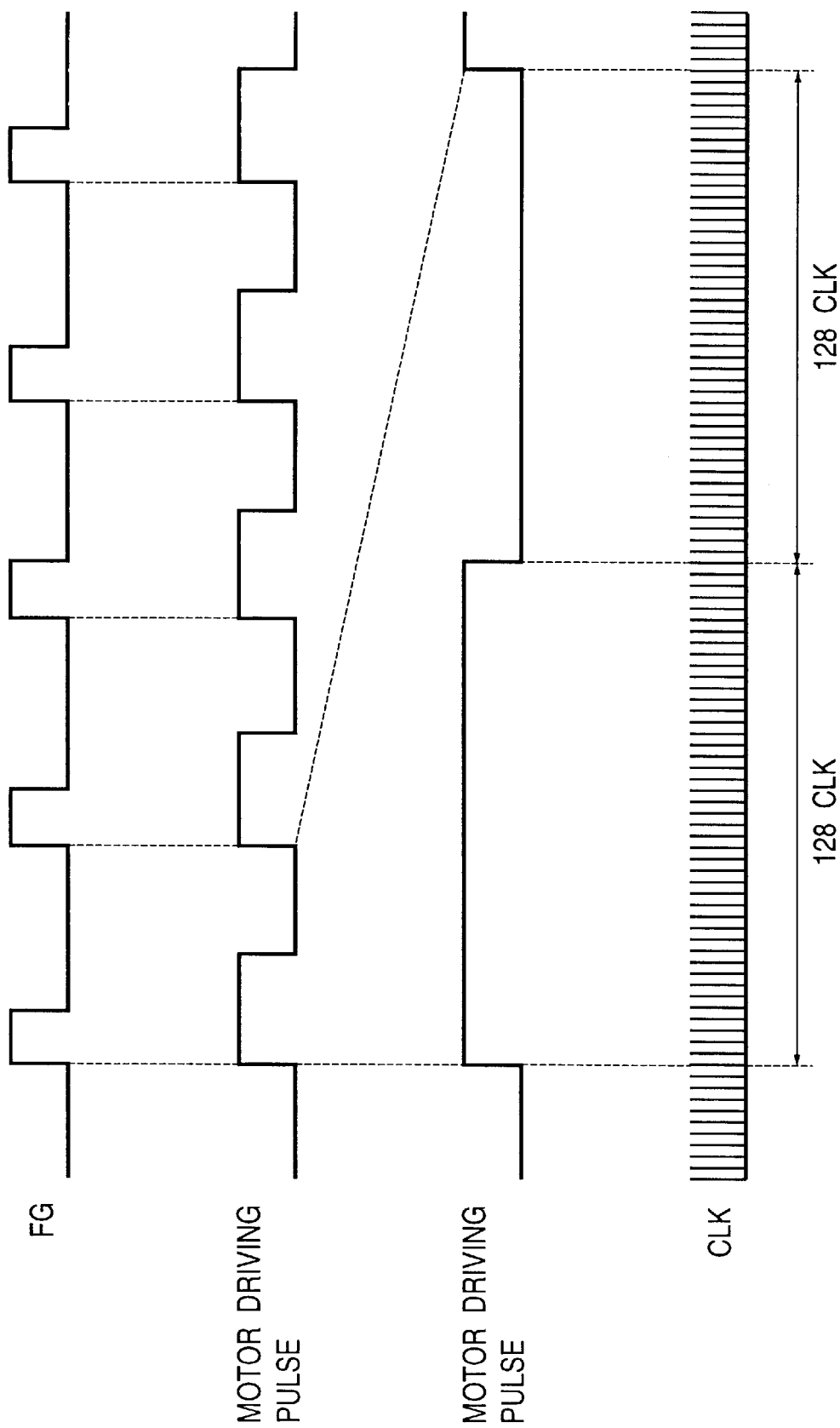
FIG. 7 is a timing chart showing the FG pulse and motor driving pulses.

FIG. 7 is a timing chart of the motor driving pulses. The PLL circuit 16 detects the phase difference between the FG pulse and the motor driving pulse supplied from the counter 23 and a frequency deviation, and then compares the detected phase difference and the frequency deviation with each other to perform PLL control. In such the PLL control, a driving voltage to be applied to the polygon motor 17 is controlled. Therefore, the phase of the input FG pulse coincides with the phase of the motor driving pulse. By such the control, rotation speed and a rotation phase of the polygon motor 17 can be controlled.

Figure 4:
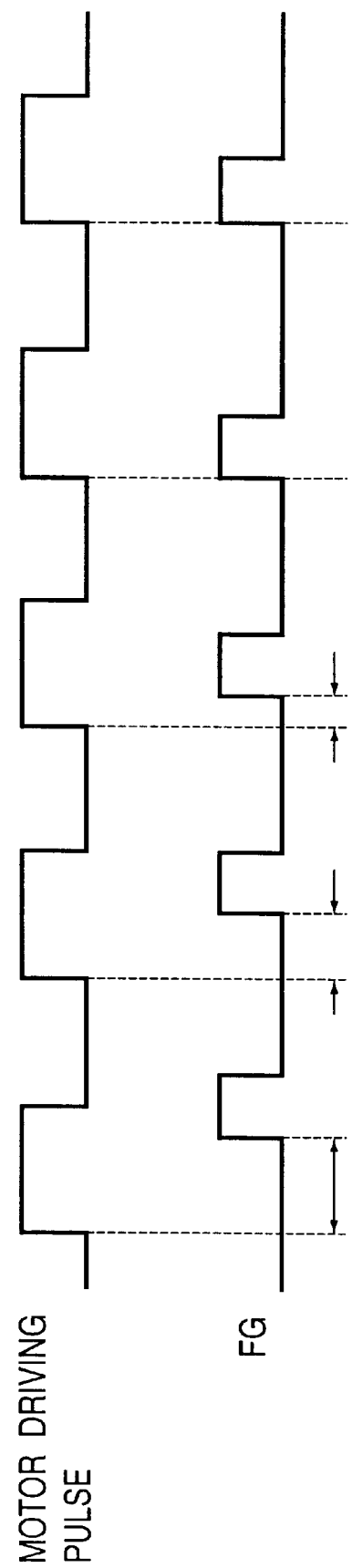
FIG. 4 is a timing chart showing respective signals in PLL (phase-locked loop) control.

FIG. 4 is a timing chart showing the motor driving pulse and the FG pulse in such the control. In this case, for simplifying the explanation, it is assumed that frequencies of the FG pulse and the motor driving pulse are identical. As a result of the PLL control, the phase difference becomes gradually smaller and finally becomes zero, whereby the phases of the motor driving pulse and the FG pulse coincide with each other. By such an operation, the position of the rotor 81 can be controlled based on the counted value of the counter 23. In the present embodiment, when 256 clocks are output from the oscillator 12, the one FG pulse is output, i.e., the polygon mirror rotates by ¼ rotation. However, when changing the number of such the clocks and the frequency of the oscillator, accuracy in position control of the rotor 81 can be changed.

When a signal which is input from a CPU (not shown) and represents that the plane image to be formed on the photosensitive body is a first-color plane image and the ITOP signal are both input into an AND gate 21, a latch 22 latches the value of the counter 23 in synchronism with the rise of such the ITOP signal.

Subsequently, it will be explained a case where the second- and subsequent-color plane images are formed.

When the ITOP signal for forming the second- and subsequent-color plane images is input into an inverter 24 and then into a load terminal of the counter 23 through an AND gate 25, the counted value of the first color which has been supplied from the latch 22 is preset in the counter 23. That is, it is performed control such that the counted value of the counter 23 when the ITOP signal is risen is identical in every colors, whereby the phase difference between the ITOP signal (at rise time) and the FG pulse can be always made constant. Further the phase difference between the ITOP signal and the BD signal comes to always have the constant value. As a result, when the first-color plane image and the second- and subsequent-color plane images are superimposed, the positions where these images are formed can be surely coincided with others, whereby the high-quality color image can be formed.

SECOND EMBODIMENT

Figure 3:
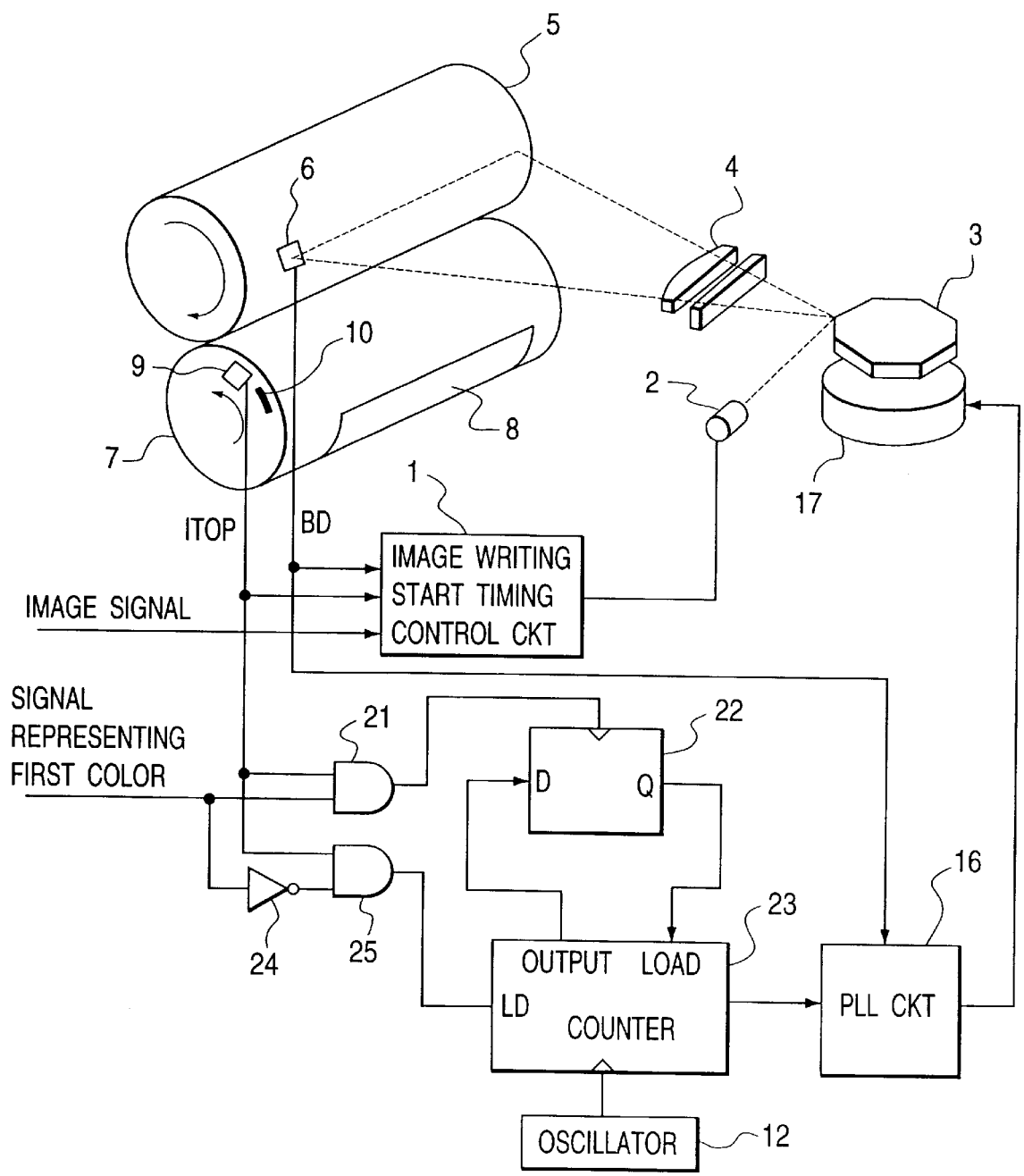
FIG. 3 is a diagram showing the structure of a color image formation apparatus according to a second embodiment of the present invention.

FIG. 3 is a diagram showing the structure of a color image formation apparatus according to the second embodiment of the present invention. In FIG. 3, the same elements as in FIG. 1 are added with the same reference numerals. Hereinafter, it will be explained the points which are different from the first embodiment.

In the above-described first embodiment, the PLL control is performed based on the FG pulse and the motor driving pulse. However, in the present embodiment, such PLL control is performed based on a BD signal and a motor driving pulse. That is, a PLL circuit 16 detects a phase difference between the BD signal and the motor driving pulse of a counter 23 and also detects a frequency deviation and then compares the detected phase difference and the frequency deviation with each other, to perform the PLL control. In such the PLL control, a driving voltage to be applied to a polygon motor 17 is controlled. Therefore, the phase difference between the BD signal and the motor driving pulse becomes always constant. For this reason, phases of the BD signal and the motor driving pulse coincide with each other.

In FIG. 6, since a frequency of the BD signal is equal to two times as large as that of the FG pulse, the phase difference of the motor driving pulse can be compared with the frequency deviation plural times the number thereof being equal to two times as much as the case in the first embodiment where the PLL control is performed based on the FG pulse. Therefore, the more-accurate PLL control can be performed.

In the first and second embodiments, as shown in FIG. 6, the number of planes of the polygon mirror is eight and the number of the FG sensors is four. However, if the number (n) of the FG sensors and the number (m) of planes of the polygon mirror satisfy relation, i.e., m=N×n (N being natural number), the same effect as described above can be obtained.

As described above, according to the first and second embodiments, in the image formation apparatus which forms the color image by sequentially forming the plural-color plane images on the image support body, e.g., the photosensitive body, the intermediate transfer body, the recording paper on the transfer body or the like, and then superimposing these formed plural-color plane images, the rotation of the rotation polygon mirror (or polygon motor) is controlled such that the positions at which the second- and subsequent-color plane images are formed are displaced or shifted in accordance with an amount of aberration (or displacement) between the position at which the first-color plane image is formed on the image support body, e.g., the photosensitive body, the intermediate body, the recording paper or the like, and the predetermined image writing start position. Therefore, the plural-color plane images can be superimposed without any aberration or displacement in position, whereby the high-quality color image can be formed.

THIRD EMBODIMENT

Hereinafter, the third embodiment will be explained in detail.

Figure 8:
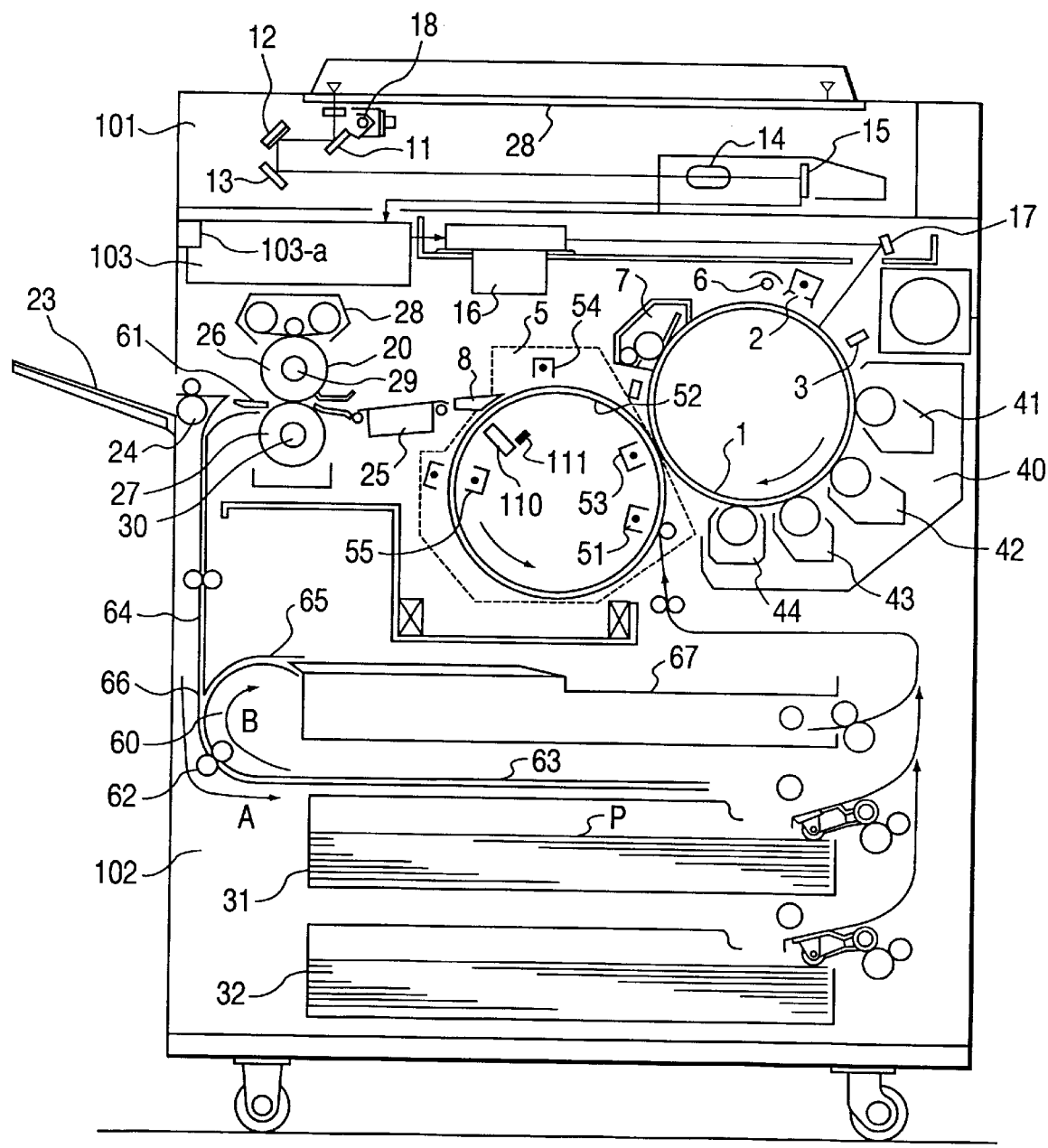
FIG. 8 is a diagram showing the entire structure of the color image formation apparatus.

FIG. 8 is a diagram showing the entire structure of the image formation apparatus which is common to all of the embodiments of the present invention. The image formation apparatus shown in FIG. 8 is a full-color electrophotographic copy machine in which an electrophotographic recording system is applied in an image formation process and also an automatic two-side copy function is provided.

In FIG. 8, reference numeral 101 denotes an image scanner unit which reads an original maximally having an A3 size and performs a digital image signal process. Reference numeral 102 denotes a printer unit which outputs an image corresponding to an original image read by the image scanner unit 101, on a recording paper with full colors.

The image scanner unit 101 is composed of a first scanning mirror 11, a second scanning mirror 12, a third scanning mirror 13, an image formation lens 14, a CCD 15 integrally having R, G and B filters, and an original illumination lamp 18.

The original which has been placed on an original support glass 28 is illuminated by the original illumination lamp 18, and the obtained original image is introduced by the first to third scanning mirrors 11 to 13 and projected onto a light reception plane of the CCD 15 through the lens 14.

The original image projected onto the light reception plane of the CCD 15 is then subjected to color separation by an RGB three-color separation filter to obtain R (red), G (green) and B (blue) components, i.e., full-color information. Subsequently, such the full-color information is converted into an electrical signal and sent to an image process unit 103.

In the present embodiment, the CCD 15 can read about 5000 pixels. Further, the original illumination lamp 18 and the first scanning mirror 11 mechanically move at speed V and also the second and third scanning mirrors 12 and 13 mechanically move at speed V/2 all in a direction perpendicular to an electrical scanning direction of the CCD 15, whereby an entire surface of the original is scanned.

An obtained image signal is subjected to various processes, such as logarithmic conversion, an UCR (under color removal) process, a masking process, gradation correction and the like, by the image process unit 103. After then, the image signal is subjected to color separation to obtain M, C, Y and BK component signals, and these signals are input into a laser scanner unit 16 within the printer unit 102.

Further, the image process unit 103 has a notch portion 103-a to which an external interface is connected. Therefore, the image which has been read by the image scanner unit 101 can be stored or filed in a memory or a disk as an image file, through a host computer externaly connected to the image process unit 103.

In this case, the image process unit 103 includes therein a reference signal generation circuit for main scanning and a reference signal generation circuit for sub scanning which are synchronously operated. Therefore, since the image is read on the basis of two reference signals respectively generated from these reference signal generation circuits, the image having no color aberration or displacement can be filed or stored. However, such an operation does not directly relate to the present embodiment, and thus the detailed explanation thereof is omitted.

On the basis of one-time original scanning by the image scanner unit 101, one of the M, C, Y and BK components is sent to the laser scanner unit 16. Therefore, one full-color recording is completed on the basis of the total four-time original scanning.

In the laser scanner unit 16, modulation driving of a semiconductor laser is performed in accordance with the image signal. A laser beam generated from the semiconductor laser is sent onto a photosensitive drum 1 through a polygon mirror, a lens and a fixed mirror 17 within the laser scanner unit 16, whereby the photosensitive drum is scanned to form a latent image.

A primary charger 2 and a pre-exposure lamp 6 are arranged on an upper side of the photosensitive drum 1, and a surface potential sensor 3 for measuring surface potential on the drum 1 is arranged on an upper right side thereof. Before forming the electrostatic latent image, the pre-exposure lamp 6 exposes the photosensitive drum 1 to eliminate residual electric charges on the surface thereof. After then, uniform electric charges are formed (i.e., charged) thereon by the primary charger 2.

The surface potential sensor 3 exposes the surface of the photosensitive drum 1 which has been uniformly charged before forming the image, by using the laser scanner unit 16 with a predetermined amount of light. Then, the sensor 3 measures the surface potential at that time, and the measured result is fed back in controlling an amount of the charges when forming the image.

The latent image formed on the photosensitive drum 1 is subjected to toner image formation by a development device 40 arranged on a lower side of the drum 1. The development device 40 is composed of four development units 41 to 44. Each unit uses a two-component development agent obtained by mixing each of M, C, Y and BK toners and a carrier, and is controlled to close to the photosensitive drum 1 only in case of developing the corresponding color.

The toner image formed on the photosensitive drum 1 is transferred onto a recording paper P by a transfer unit 5. After then, the residual toner on the surface of the drum 1 is eliminated by a cleaning unit 7, to stand by next latent image formation.

The transfer unit 5 is composed of an absorption (or adherent) charger 51, a transfer sheet 52, a transfer charger 53, a separation charger 54 and a discharger 55. The recording paper P which has been supplied or fed from paper cassettes 31 and 32 is electrostatically absorbed or adhered to the transfer sheet 52 by the adherent charger 51. Then, after the toner image has been transferred by the transfer charger 53, the recording paper P is separated from the transfer sheet 52 by a separation pawl 8 and the separation charger 54. Further, the residual electric charges on the transfer sheet 52 are eliminated to stand by next electrostatic absorption (or adhesion) of the recording paper P.

As described above, the recording paper P on which the toner image has been transferred by the transfer unit 5 and which has been separated is sent to a fixing unit 20 by a transfer-paper feeding system 25, whereby the toner image on the recording paper P is fixed.

The fixing unit 20 is composed of an upper fixing roller 26, a lower fixing roller 27, a fixing cleaner 28, an upper fixing heater 29 and a lower fixing heater 30. The toner on the recording paper P is melted due to heat energy from the upper and lower fixing heaters 29 and 30, and the melted toner is entangled in fibrous material of the recording paper P due to pressure between the upper and lower fixing rollers 26 and 27, whereby the toner is fixed. The upper and lower fixing heaters 29 and 30 are arranged respectively at central portions of the upper and lower fixing rollers 26 and 27, whereby temperature on a surface of each of the upper and lower fixing rollers 26 and 27 is independently adjusted or controlled to be constant. Further, the fixing cleaner 28 is arranged above the upper fixing roller 26, whereby dust on the surface of the upper fixing roller 26 is wiped up by a web in which silicone oil is permeated.

The recording paper P which has been fixed by the fixing unit 20 is discharged by a pair of paper discharge rollers 24 to a paper discharge tray 23, when rear-side copy terminates in a predetermined mode, e.g., a one-side mode or a two-side mode. On the other hand, the paper P is fed to a two-side unit 60 by a two-side flapper 61, when front-side copy terminates in the two-side mode.

The two-side unit 60 is composed of a pair of reverse rollers 62, a reverse tray 63, a two-side feeding system 64, a reverse feeding system 65, a reverse guide 66 and a two-side tray 67.

The recording paper P which is fed through the two-side flapper 61 is guided by the two-side feeding system 64 to be fed to the pair of reverse rollers 62. The pair of reverse rollers 62 feed the recording paper P in a direction indicated by an arrow A to the reverse tray 63, by a length previously determined based on a size of the paper P. Subsequently, the pair of reverse rollers 62 reversely rotate to feed the paper P in a direction indicated by an arrow B, and thus the paper P is guided by the reverse feeding system 65 to be fed to the two-side tray 67. At that time, in the two-side tray 67, the reversed recording paper P is being held such that a trailing edge of the already-recorded side can be used as a leading edge for subsequent rear-side recording. Further, the reverse guide 66 is provided at a contact point of the two-side feeding system 64 and the reverse feeding system 65 such that the recording paper P is not fed to the two-side feeding system 64 when feeding it in the direction indicated by the arrow B.

The recording paper P on the two-side tray 67 is again fed into the transfer unit 5 in the same manner as the paper feeding from the cassettes 31 and 32. Then, the image is transferred onto a rear side (or surface) of the recording paper P and fixed by the fixing unit 20. Subsequently, the paper P is discharged to the paper discharge tray 23 by the pair of paper discharge rollers 24.

Figure 9:
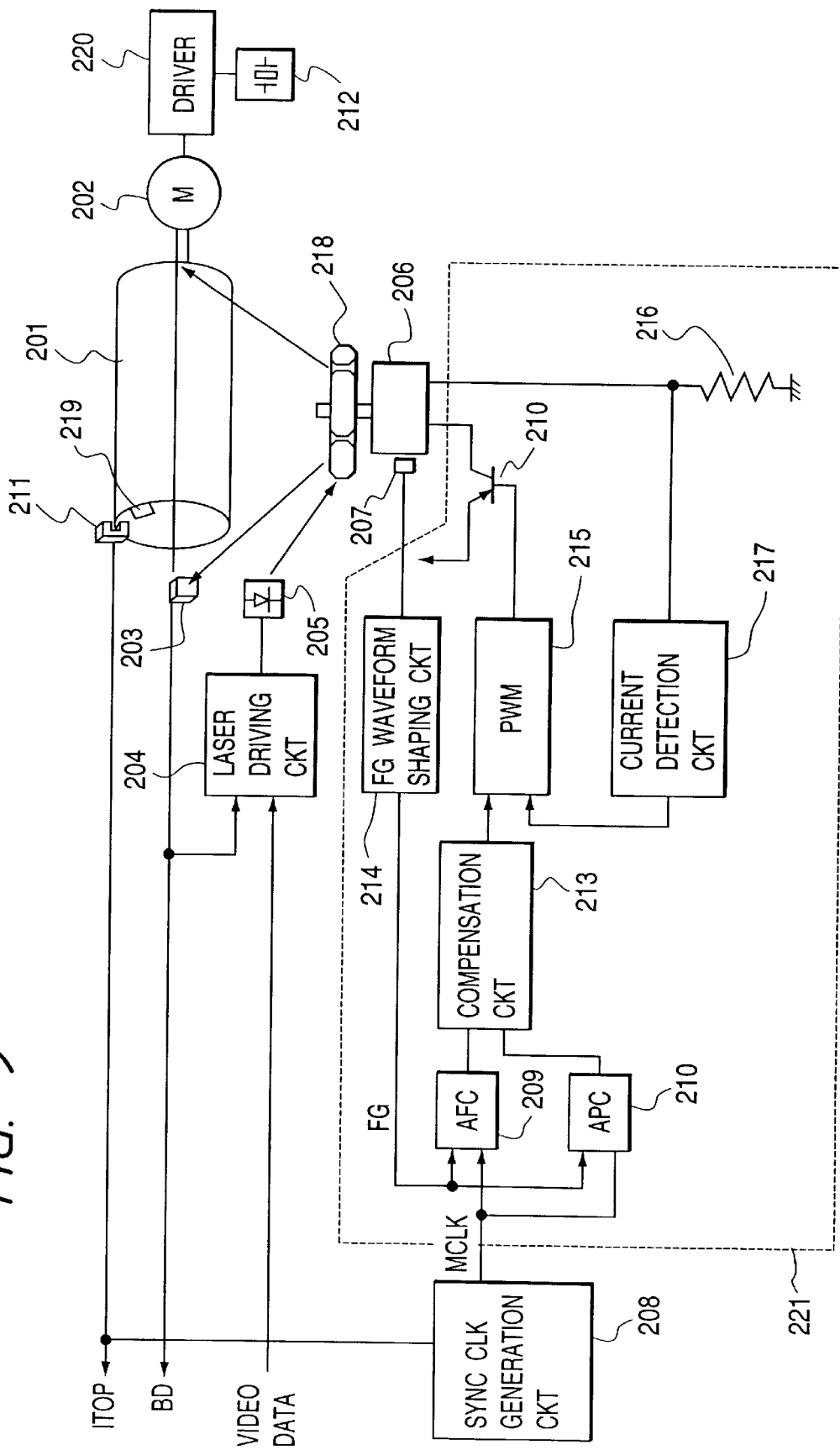
FIG. 9 is a circuit diagram for explaining the circuit structure.

FIG. 9 is a diagram showing the third embodiment of the present invention which will be explained hereinafter.

In FIG. 9, reference numeral 208 denotes a sync clock generation circuit which generates, in synchronism with an ITOP signal, a reference clock MCLK for performing PLL control of a scanner motor 206.

In the present embodiment, it is assumed that a polygon mirror 218 having eight planes or surfaces is used. Further, an FG pulse is generated by an FG sensor 207 and an FG waveform shaping circuit 21, and the four FG pulses are output per one rotation of the scanner motor 206. Therefore, the two BD signals are output during the one FG pulse is output.

Figure 12:
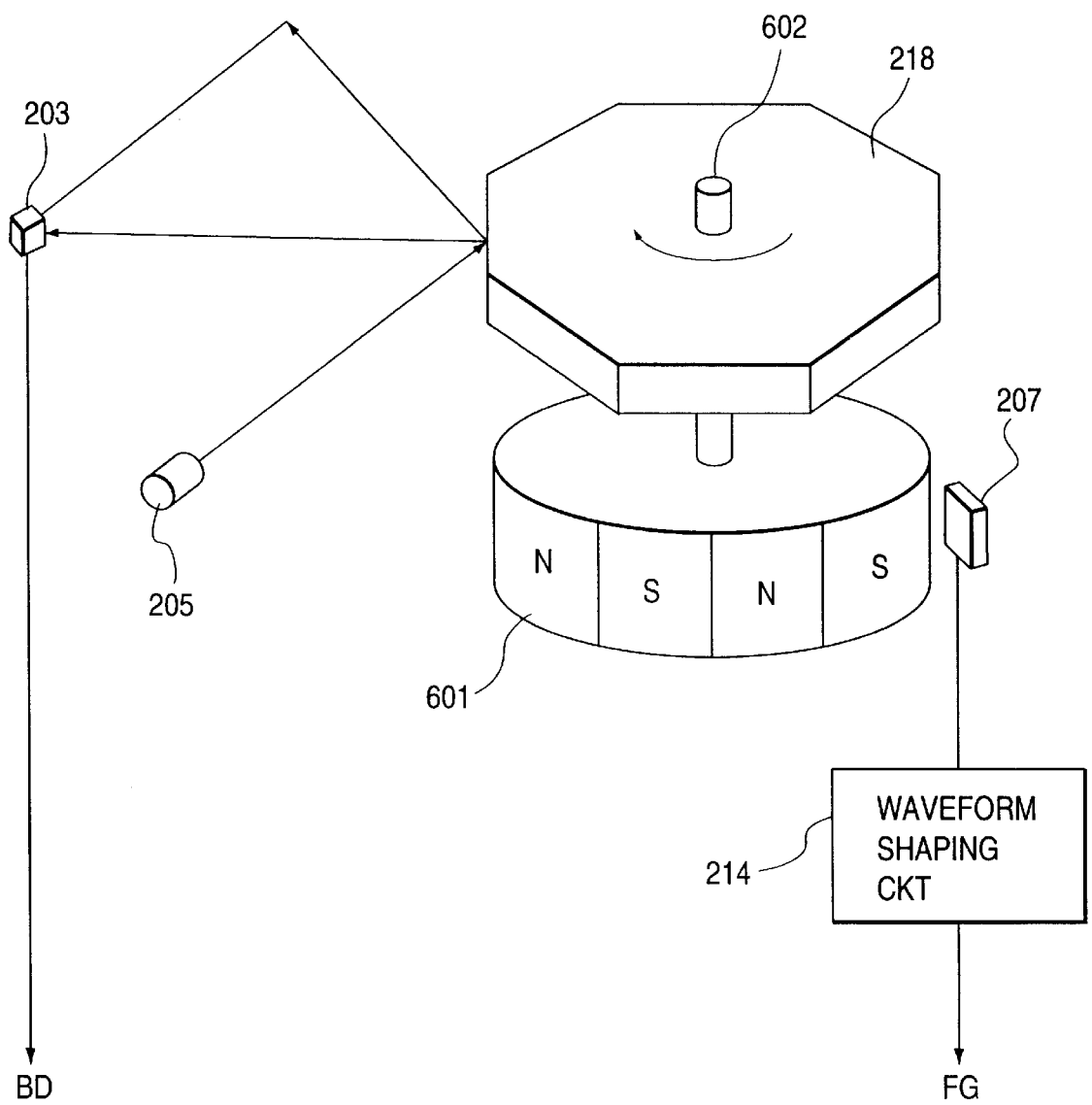
FIG. 12 is a diagram for explaining the structure of a scanner motor.

FIG. 12 is a diagram for explaining the structure of the scanner motor 206.

In FIG. 12, reference numeral 601 denotes a rotor of the scanner motor 206. The rotor 601 has a permanent magnet on which four pairs of pole patterns (corresponding to one rotation of rotor 601) are polarized. Further, a polygon mirror 218 is fixed to the rotor 601 through a spindle 602.

When the scanner motor 206 rotates, the FG sensor 207 generates four pulses per one rotation from the pole patterns polarized on the rotor 601. The generated pulses are subjected to waveform shaping by the FG waveform shaping circuit 214, and then the FG pulses are output.

On the other hand, a laser beam illuminated from a laser 205 is used to perform the scanning by the polygon mirror 218 which rotates identically with the rotor 601. Then, a BD sensor 203 outputs the BD signal, i.e., a reference signal in a main-scanning direction.

Figure 13:
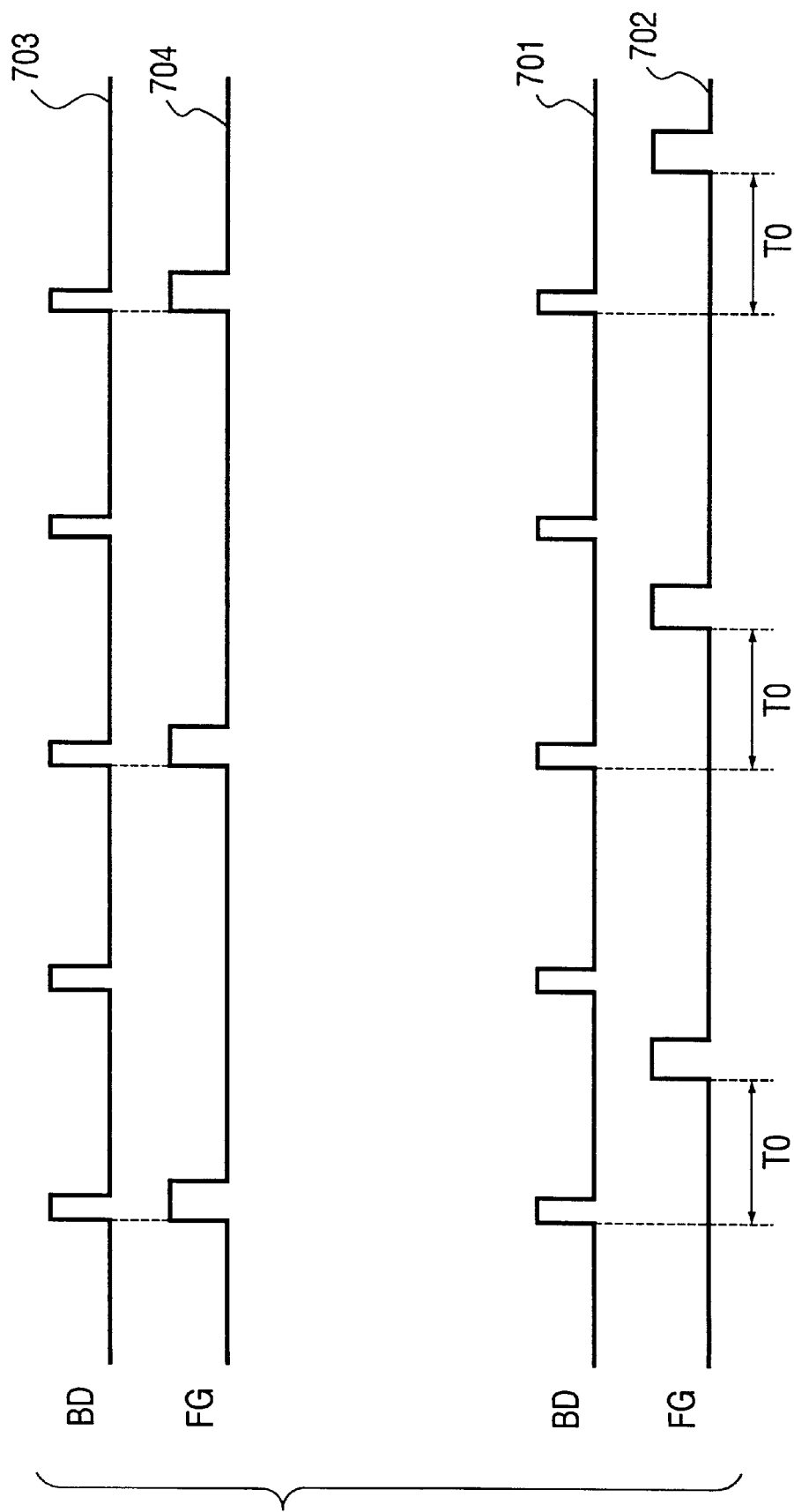
FIG. 13 is a timing chart for explaining relation of the BD signal and the FG pulse.

FIG. 13 is a timing chart for explaining relation between the BD signal and the FG pulse.

In FIG. 13, reference numerals 701 and 702 denote the BD signal and FG pulse, respectively.

The polygon mirror 218 has the eight planes and the pole patterns of the rotor 601 generate four pulses per one rotation, whereby the one FG pulse is output during the two BD signals are output. Further, as described above, since the rotor 601 and the polygon mirror 218 are fixed to each other, the rotor 601 and the polygon mirror 218 identically rotate, whereby the BD signal which has surely a phase difference time T0 with reference to the FG pulse is generated, as in the relation between the BD signal 701 and the FG pulse 702. Such the phase difference time T0 changes only due to an initial attachment angle of the polygon mirror 218 onto the rotor 601. Therefore, when the polygon mirror 218 is once attached onto the rotor 601 and fixed, the phase difference time T0 does not change.

Therefore, as shown in the relation between the BD signal 703 and the FG pulse 704 in FIG. 13, according to the attachment angle of the polygon mirror 218 onto the rotor 601, the phase difference time T0 between the BD signal and the FG pulse can be made zero, whereby phases thereof can be completely coincided with each other.

According to such an operation, the FG pulse of the scanner motor 206 can be managed or used as completely or substantially the same as the reference signal (i.e., BD signal) in the main-scanning direction. Therefore, there are possible various application, e.g., for using the FG pulse instead of the BD signal.

Figure 10:
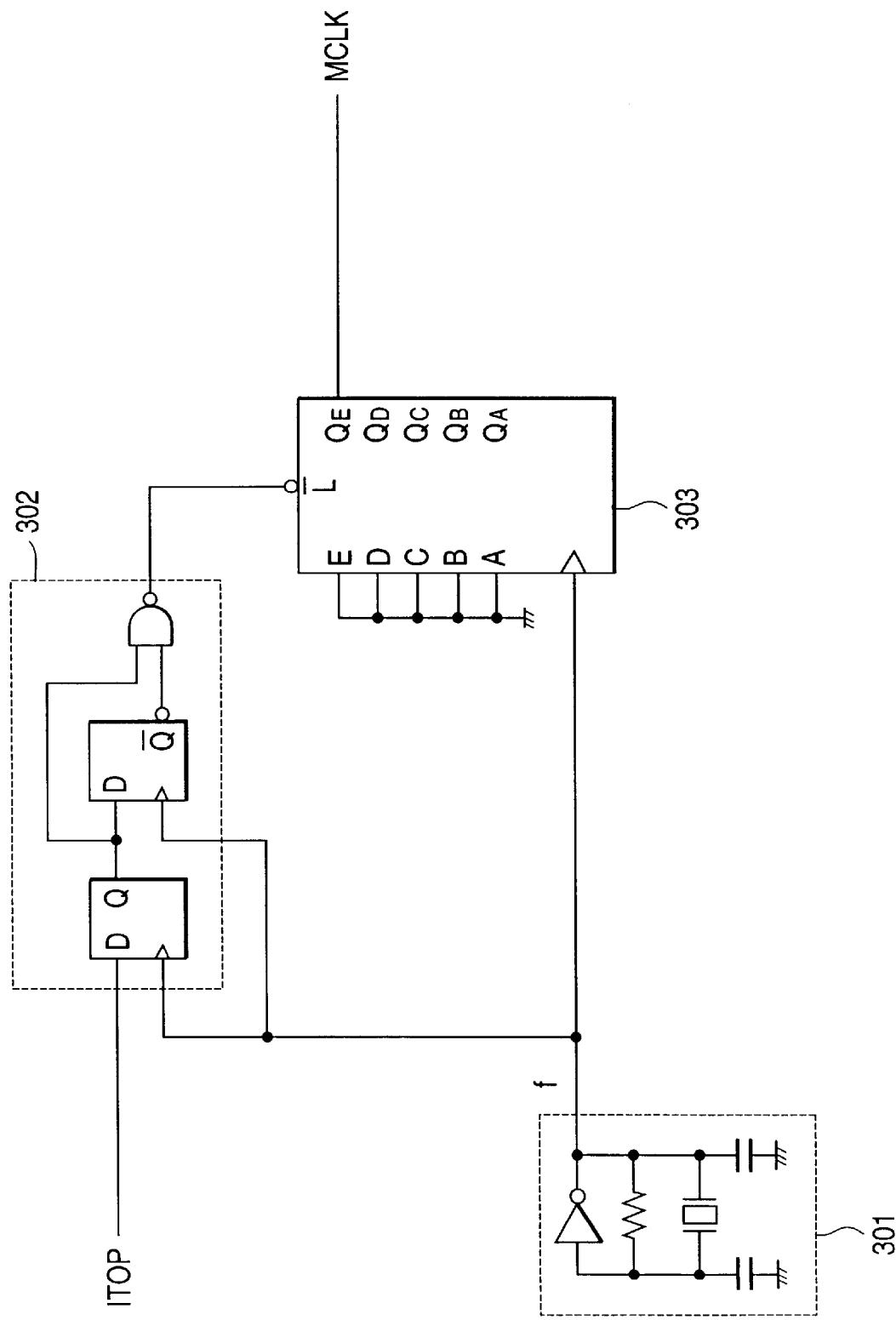
FIG. 10 is a circuit diagram for explaining a sync clock generation circuit.

FIG. 10 is a block diagram showing the internal structure of the sync clock generation circuit 208 which is used in the present embodiment.

In FIG. 10, reference numeral 301 denotes an oscillation circuit based on a quartz resonator. In the circuit 301, a used frequency of an oscillation clock f is 32 times higher than that of the reference clock MCLK used in subsequent stages.

Reference numeral 302 denotes a sync signal generation circuit which outputs an L-level signal by one clock of the oscillation clock f, at a rise of the ITOP signal.

Reference numeral 303 denotes a five-bit sync-type counter. In the counter 303, the oscillation clock f from the oscillation circuit 301 is input into a clock terminal, an output signal from the sync signal generation circuit 302 is input into a setting value load terminal, zero-level data is input into setting value terminals, and the reference clock MCLK is output from a most significant count output.

When the ITOP signal is input, a load signal from the sync signal generation circuit 302 is input into the counter 303. Then, when the clock is risen during the load signal is being active, the counter 303 sets all the count output to zero and starts counting at the rise of the next clock. By such the operation, the counter 303 can generate the reference clock MCLK in synchronism with the ITOP signal.

Figure 11:
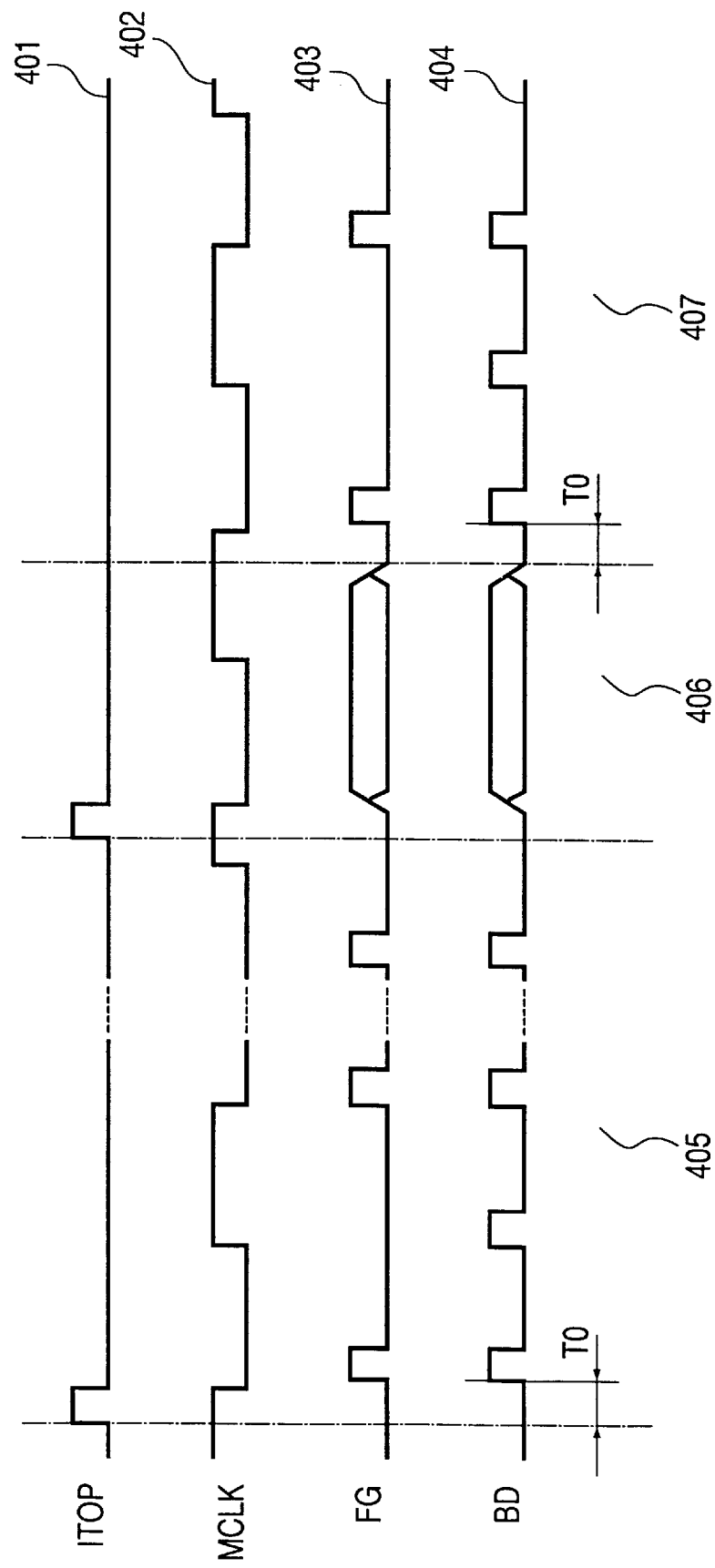
FIG. 11 is a timing chart for explaining operation timings.

FIG. 11 is a timing chart for explaining operation timings in the present embodiment.

In FIG. 11, reference numerals 401, 402, 403 and 404 denote the ITOP signal, the reference clock MCLK, the FG pulse and the BD signal, respectively. In this case, in order to simplify the explanation, the operation will be explained hereinafter on the premise that the phase difference between the FG pulse 403 and the BD signal 404 is zero.

When an image recording operation starts and the initial ITOP signal is input, image formation for a first color is performed (interval 405). At that time, the reference clock MCLK is reset by the sync clock generation circuit 208 such that the clock MCLK synchronizes with the ITOP signal. Further, the FG pulse is subjected to PLL control on the basis of the reference clock MCLK, and the BD signal is output in synchronism with the rotation of the scanner motor 206. Therefore, the ITOP signal and the BD signal are controlled to have the phase difference (i.e., T0 in FIG. 11). It should be noted that, during the interval 405 in FIG. 11, it is illustrated for the explanation that the ITOP signal and the reference clock MCLK are input in synchronism with each other.

When the next ITOP signal is input after the image recording corresponding to a predetermined number of lines terminated, the image formation for a second color starts. In this case, since the ITOP signal and the reference clock MCLK do not synchronize with each other, such the reference clock MCLK is again reset by the sync clock generation circuit 208 such that the clock MCLK synchronizes with the ITOP signal. Then, after elapsing a time (i.e., interval 406) until a system becomes stable, the ITOP signal and the BD signal can be controlled to have the substantial phase difference (T0) until the image formation (or recording) for the second color is actually performed (i.e., interval 407).

By such structure, the image formation for third and fourth colors are controlled in the same manner as above. As a result, the phase difference between the reference signal in the main scanning and the reference signal in the sub scanning can be always maintained to be constant (T0), whereby the high-quality color image can be formed without any color aberration of displacement.

FOURTH EMBODIMENT

In the above-described third embodiment, the polygon mirror 218 having the eight planes is used and the four FG pulses are output per one rotation of the scanner motor 206. However, even if the number of the FG pulses which are output per one rotation of the scanner motor 206 is two, the fundamental sync relation can be maintained. In this case, the frequency of the reference clock lowers. Therefore, the rotation of the scanner motor 206 can be easily controlled, e.g., in a case where the number of rotation of the motor 206 increased.

FIFTH EMBODIMENT

Furthermore, even if the number of the FG pulses which are output per one rotation of the scanner motor 206 is only one, the fundamental sync relation can be maintained, and also the frequency for controlling the rotation can be lowered. Therefore, the rotation of the scanner motor 206 can be easily controlled, e.g., even in a case where the number of rotation of such the motor 206 more increased.

SIXTH EMBODIMENT

In the above-described third embodiment, the polygon mirror 218 having the eight planes is used and the four FG pulses are output per one rotation of the scanner motor 206. However, there is no need for the polygon mirror 218 to have the eight planes. That is, the polygon mirror 218 may have, e.g., the four or sixteen planes. Further, if the number of the FG pulses which are output per one rotation of the scanner motor 206 is set to be the same as the number of the planes of the polygon mirror 218, the FG pulse and the BD signal have a one-to-one correspondence with a predetermined phase difference, whereby it can be obtained a specific effect that accuracy in correcting the color aberration or displacement more increases.

Furthermore, the embodiments of the present invention have been explained on the basis of the full-color copy machine. However, the present invention is not restricted to such the full-color copy machine, but can be applied to a color printer in which image recording is performed by scanning a photosensitive drum or a photosensitive belt with a polygon mirror.

In the above-described third to sixth embodiments, the reference clock MCLK which has been output from the sync clock generation circuit 208 is reset such that the clock MCLK is synchronized with the ITOP signal, whereby the clock MCLK based on the ITOP signal is synchronized with the FG pulse. However, the present invention is not restricted to such the operation. That is, e.g., the FG pulse and the reference clock MCLK may be synchronized with each other by controlling the phase of the output signal from the FG waveform shaping circuit 214 to be delayed for a predetermined time in accordance with the ITOP signal.

Further, the plurality of reference clocks MCLK respectively having the different phases are held, and then one of these clocks may be selected in accordance with the ITOP signal. Furthermore, either one of the FG pulse (or BD signal) and the reference clock MCLK may be controlled in accordance with the ITOP signal.

The present invention may be applied to the apparatus of a type where the plural-color toner images are once formed on the photosensitive drum 1 and then these images are collectively transferred onto the recording paper on the transfer unit (i.e., transfer drum) or the intermediate transfer body. Also, the present invention may be applied to the apparatus of a type where each color component is transferred onto the photosensitive drum or the intermediate body in a plane sequential manner.

According to the above-described present embodiment, in the case where the image support body is scanned by the light beam, the phase difference between the driving in the main and sub scanning directions can be constantly maintained with simple circuit structure, whereby the high-quality image can be formed.

SEVENTH EMBODIMENT

Hereinafter, the seventh embodiment will be explained with reference to the attached drawings.

Figure 14:
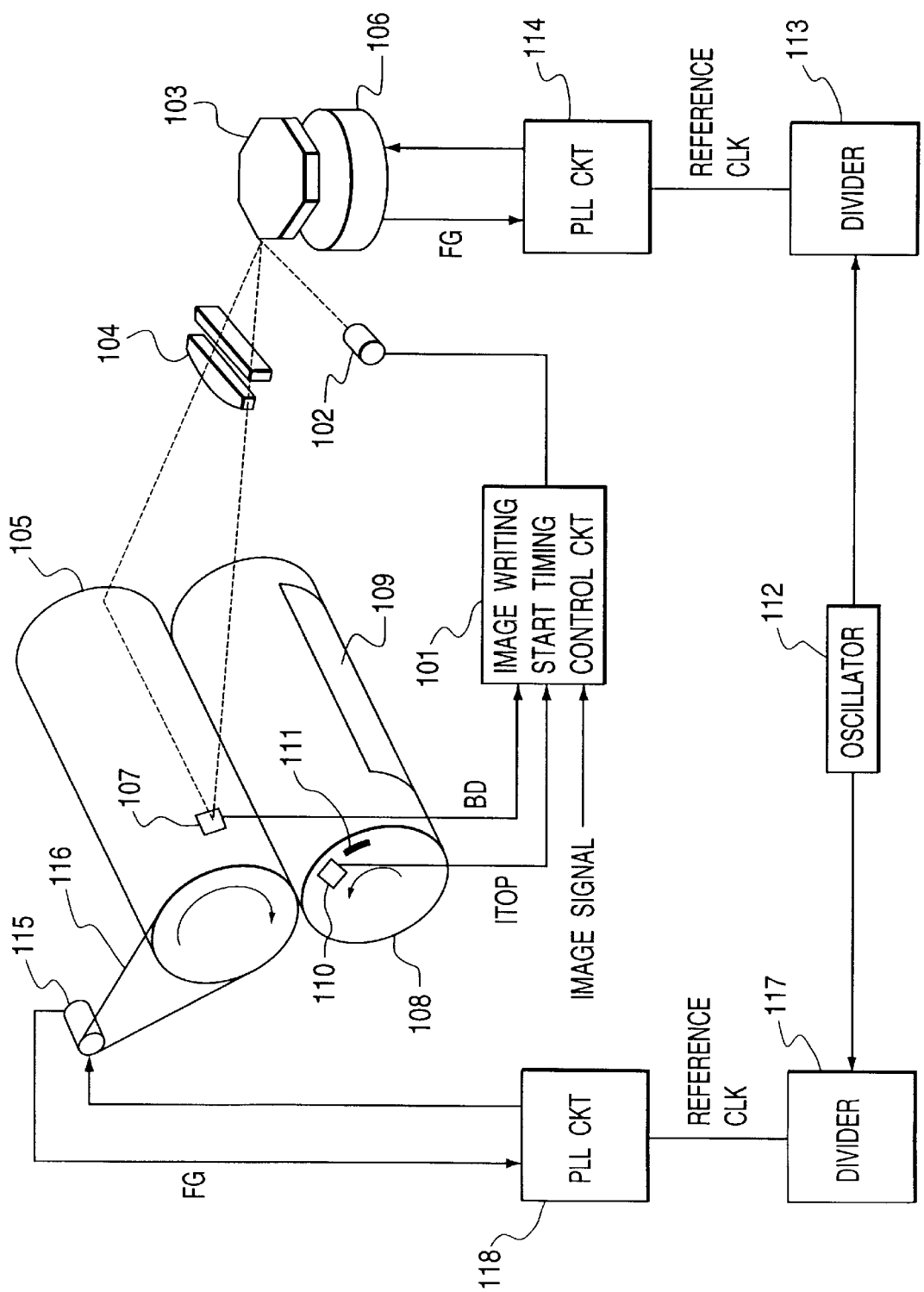
FIG. 14 is a diagram showing the structure of a printer unit.
Figure 15:
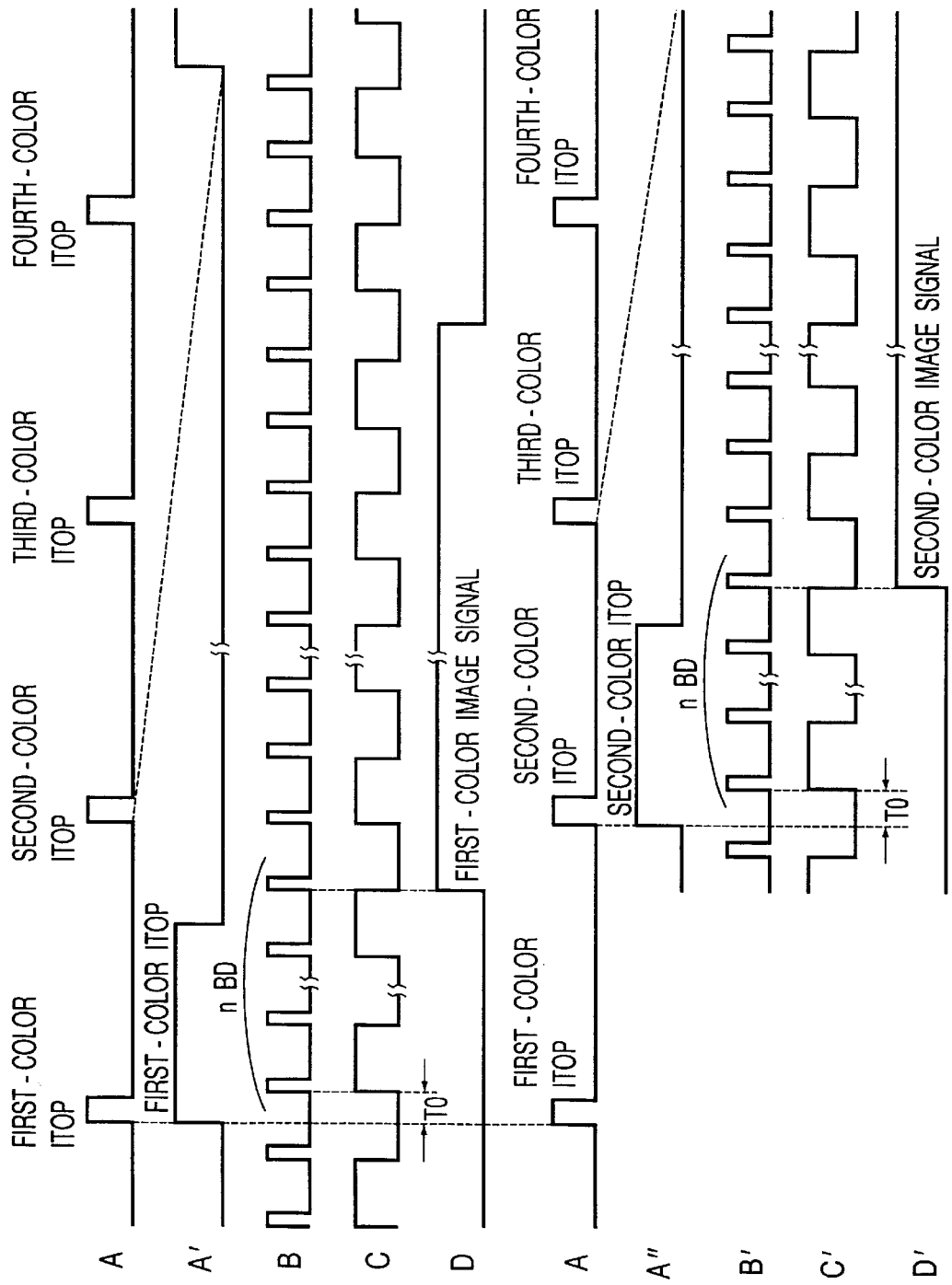
FIG. 15 is a timing chart showing respective signals in a seventh embodiment of the present invention.

FIG. 14 is a diagram showing an example of the printer unit 102 (FIG. 3) in the present embodiment, and FIG. 15 is a timing chart showing various signals managed in the printer unit 102.

In FIG. 14, an image signal which has been supplied from an external apparatus such as an image scanner, a computer or the like (not shown) is sent to an image writing start timing control circuit 101. The image writing start timing control circuit 101 performs modulation driving of a semiconductor laser 102 in response to M, C, Y and BK image signals.

A laser beam generated from the semiconductor laser 102 is reflected on a rotating polygon mirror 103 and subjected to fθ correction by an f-θ lens 104, and then scanning is performed on a photosensitive drum 105. By such an operation, an electrostatic latent image is formed on the photosensitive drum 105. A clock generated by an oscillator 112 is divided by a frequency divider 113 and then supplied to a PLL circuit 114 as a motor driving pulse (i.e., reference clock CLK), whereby a polygon motor 106 rotatively drives the polygon mirror 103. The PLL circuit 114 detects a phase difference between an FG pulse from the polygon motor 106 and the reference clock CLK from the divider 113, and a frequency deviation. Then, the PLL circuit 114 compares the detected phase difference and the frequency deviation with each other such that the phases of the FG pulse and the reference clock CLK coincide with each other, so as to perform the PLL control for controlling a driving voltage applied to the polygon motor 106. A BD sensor 107 is provided near a scanning start position of one line of the laser beam to detect line scanning by the laser beam. Then, the BD sensor 107 generates a scanning start reference signal (i.e., BD signal) for each line as shown by a timing B in FIG. 15.

Further, M, C, Y and BK development units 41, 42, 43 and 44 are provided around the photosensitive drum 105. These four development units 41 to 44 are alternately contacted to the photosensitive drum 105 during the drum 105 rotates four times, to perform development by using toners corresponding to the C, M, Y and BK electrostatic latent images formed on the photosensitive drum 105. Toner images which have been developed by the development units 41 to 44 are transferred onto a recording paper 109 which has been supplied from the paper cassette 31 or 32 and then wound around a transfer drum 108.

After M, C, Y and BK four colors are sequentially transferred onto the recording paper 109 in such a manner as described above, the paper 109 is discharged through the fixing unit 27. In the transfer drum 108 (or 52), it is provided a sensor 110 which generates an ITOP signal representing a leading position of the paper 109 on the transfer drum 108. Therefore, when the transfer drum 108 rotates and thus a flag 111 fixed within the drum 108 passes through the sensor 110, the ITOP signal for each color is generated as a timing A shown in FIG. 15. A clock from the same oscillator 112 as that for driving the polygon motor 106 is divided by a frequency divider 117 and then supplied to a PLL circuit 118 as a motor driving pulse (i.e., reference clock CLK), whereby a photosensitive drum motor 115 rotatively drives the photosensitive drum 105.

The PLL circuit 118 detects a phase difference between a motor FG pulse from the photosensitive drum motor 115 and the reference clock CLK from the divider 117, and a frequency deviation. Then, the PLL circuit 118 compares the detected phase difference and the frequency deviation with each other such that the phases of the FG pulse and the reference clock CLK coincide with each other, so as to perform the PLL control for controlling a driving voltage applied to the photosensitive drum motor 115.

The photosensitive drum 105 is rotatively driven in a direction indicated by an arrow with the photosensitive drum driving motor 115, through a gear belt 116. Further, the transfer drum 108 is mechanically connected to the photosensitive drum 105 through a gear (not shown), whereby the transfer drum 108 is rotatively driven in a direction (sub-scanning direction) indicated by an arrow. The BD signal from the BD sensor 107 and the ITOP signal from the sensor 110 are input into the image writing start timing control circuit 101, and then the circuit 101 sends the image signal to the semiconductor laser 102, e.g., at a following timing. That is, after a rise of the ITOP signal is detected, the image signal is irradiated as a laser modulation beam onto the photosensitive drum 105 in synchronism with a rise of the n-th BD signal, as a timing D shown in FIG. 15.

Figure 16:
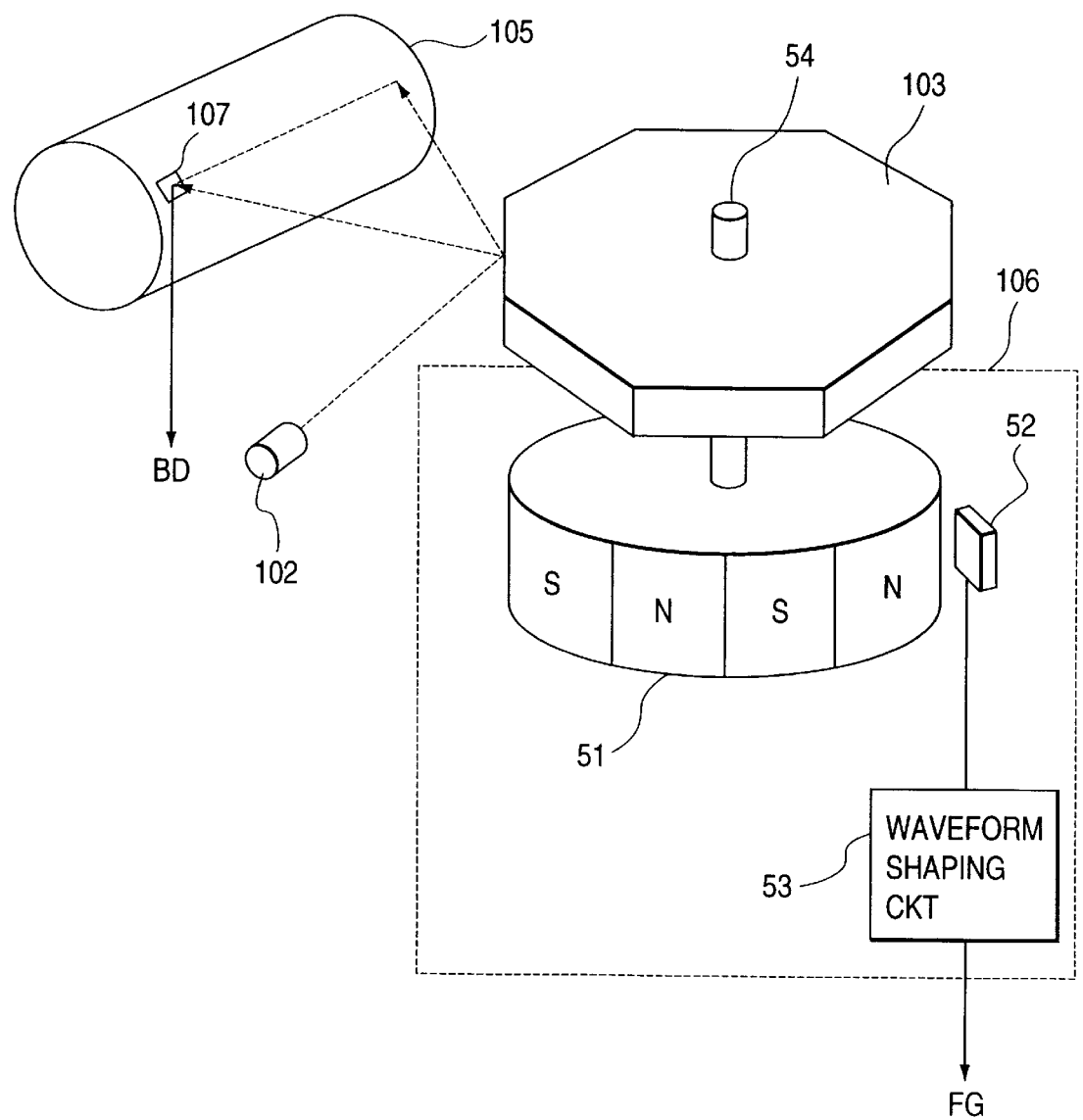
FIG. 16 is a diagram showing the structure of a polygon motor.

FIG. 16 is a diagram showing the structure of the polygon motor 106. The number of FG pulses per one rotation of the polygon motor 106 is 1/(integer equal to or larger than 2 and also corresponding to the number of planes of the polygon mirror 103). In the present embodiment, the polygon mirror 103 having the eight planes is used, and the FG pulse generated by an FG sensor 52 and an FG waveform shaping circuit 53 is output by four per one rotation of the polygon motor 106. Therefore, the two BD signals are output during the one FG pulse is output. Reference numeral 51 is a rotor of the polygon motor 106. The rotor 51 has a permanent magnet on which four pairs of pole patterns are polarized.

Further, the polygon mirror 103 is fixed to the polygon motor 106 through a spindle 54 which is also fixed to the rotor 51. When the polygon motor 106 rotates, the FG sensor 52 generates four pulses per one rotation from the pole patterns polarized on the rotor 51. The generated pulses are subjected to waveform shaping by the FG waveform shaping circuit 53, and then the FG pulses are output. On the other hand, the laser beam illuminated by the semiconductor laser 102 is used to perform the scanning on the photosensitive drum 105 through the polygon mirror 103 which rotates identically with the polygon motor 106. Then, the BD sensor 107 outputs the BD signal, i.e., the reference signal in the main-scanning direction.

FIGS. 17A and 17B are timing charts for explaining relation between the BD signal and the FG pulse. In the present embodiment, the polygon mirror 103 has the eight planes and the pole patterns of the rotor 51 generate four pulses per one rotation, whereby the one FG pulse is output during the two BD signals are output.

Further, as described above, since the rotor 51 and the polygon mirror 103 are fixed to each other, the rotor 51 and the polygon mirror 103 rotate identically, whereby the BD signal which has surely a phase difference time T1 in respect of the FG pulse is generated as shown in FIG. 17B. Such the phase difference time T1 changes only due to an initial attachment angle of the polygon mirror 103 onto the polygon motor 106. Therefore, when the polygon mirror 103 is once attached to the motor 106 and fixed, the phase difference time T1 does not change thereafter. According to the attachment angle of the mirror 103, the phase difference may be made zero as shown in FIG. 17A.

Figure 18:
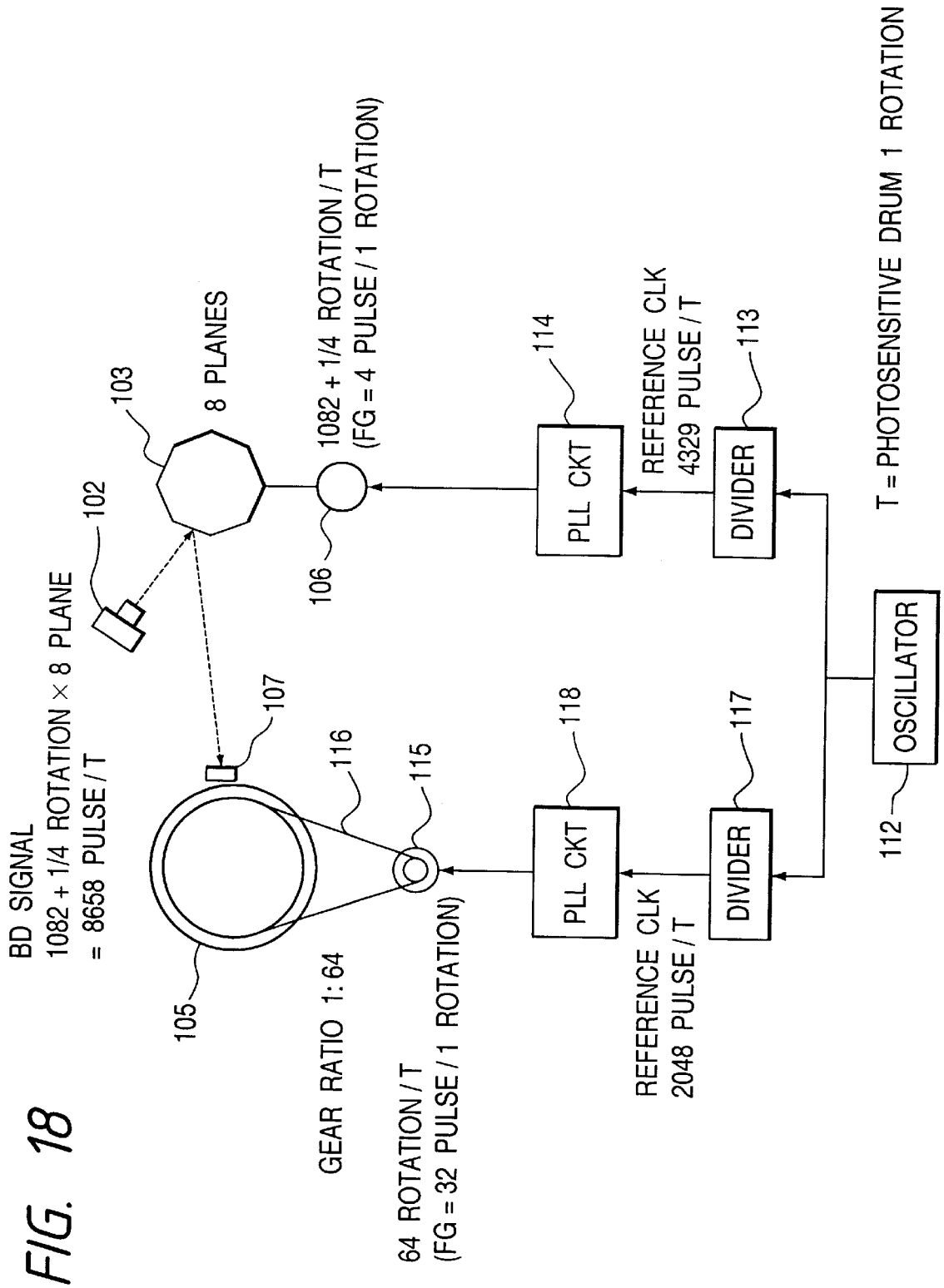
FIG. 18 is a diagram showing relation of driving methods of respective motors.

FIG. 18 is a diagram showing relation in the present embodiment, as to driving methods of the photosensitive drum motor 115 and the polygon motor 106 when the photosensitive drum 105 rotates one time.

If it is assumed that resolution of the recording image in the sub-scanning direction is 400 lpi (distance between adjacent scanning lines is 63.5 $\mu$m) and a diameter of the photosensitive drum 105 is 175 mm, the scanning for 8658 lines is performed around the photosensitive drum 105. Since the polygon mirror 103 has the eight planes, the polygon motor 106 rotates 8658÷8=1082+¼ times during the photosensitive drum 105 rotates one time. Since the number of FG pulses per one rotation of the polygon motor 106 is four, the reference clocks need (1082+¼)×4=4329 pulses.

If it is assumed that the photosensitive drum motor 115 has a gear ratio such that motor 115 rotates 64 times during the photosensitive drum 105 rotates one time, and that the number of FG pulses per one rotation of the photosensitive drum motor 115 is 32, the reference clocks need 32 pulses for the sake of one rotation of the photosensitive drum motor 115. Therefore, the reference clocks need 64 rotations×32 pulses=2048 pulses for the sake of one rotation of the photosensitive drum 105.

Such the gear ratio n is set to have natural number. If it causes the motor and a deceleration gear to rotate integer times during the photosensitive drum 105 rotates one time, influence due to deviations of a motor axis and the deceleration gear per each rotation of the photosensitive drum 115 can be set always identical, so as to get rid of color aberration due to such the deviations. This is the reason why the ratio n is set to have the natural number.

In order to provide the structure that the integer-number of FG pulses are output from the polygon motor 106 during the photosensitive drum 105 rotates one time, there are used the reference clocks which have been generated from the same quartz oscillator 112 and then independently. That is, the clocks from the quartz oscillator 112 are divided such that the reference clocks of 4329 pulses are output to the polygon motor 106 during the reference clocks of 2048 pulses necessary for one rotation of the photosensitive drum 105 are output. For this reason, dividing ratios of the frequency dividers 113 and 117 satisfy following relation.

divider 113 (polygon motor 106 side):divider 117 (photosensitive drum motor 115 side)=(the number of reference clocks to be supplied to the drum motor and necessary for one rotation of the photosensitive drum) :(the number of reference clocks to be supplied to the polygon motor at that time)=2048:4329

FIG. 19 is a diagram showing relation between the BD signal and the FG pulse generated from the polygon motor, on the photosensitive drum 105. When the photosensitive drum 105 rotates one time, the integer number of FG pulses can be obtained from the polygon motor 106. Therefore, e.g., it is assumed that the eight FG pulses can be obtained as shown in FIG. 19 (1082+¼ rotations×4 pulses=4329 FG pulses can be obtained for practical purposes, as described above). The number of FG pulses and the number of planes of the polygon mirror 103 per one ration of the polygon motor 106 satisfy relation 1:n (n is natural number equal to or larger than 2). In the present embodiment, the relation 1:2 is satisfied. This means that the BD signals of two pulses are output during the one FG pulse is output. Since phase relation therebetween does not change, points on the photosensitive drum 105 which are indicated by a plurality of arrows in FIG. 19 act as laser scanning lines in each rotation.

The photosensitive drum 105 and the polygon mirror 103 are driven respectively by the photosensitive drum motor 115 and the polygon motor 106 which have been structured based on the frequencies obtained from the same quartz oscillator 112 and then arbitrarily divided independently. Therefore, in the case where the photosensitive drum 105 and the polygon mirror 103 rotate, the phase relation therebetween can be maintained constantly, so that any difference in rotation number does not occur and thus the relation between rotating positions of the drum 105 and the mirror 103 does not change. For this reason, on the photosensitive drum 105, the scanning line which is drawn by the laser beam in the first scanning during the second rotation overlaps the scanning line in the first scanning during the first rotation. As a result, the scanning lines of the first scanning in the first and second rotations overlap each other for each of the 8658 BD signals.

As described above, it is structured that the number of FG pulses per one rotation of the polygon motor is set to be 1/(integer corresponding to the number of planes of the polygon mirror) as well as one to one (i.e., 1/1), and that the integer number of FG pulses of the polygon motor are obtained during the photosensitive drum rotates one time. By such the structure, even if the photosensitive drum 105 rotates many times, the laser beam always scans the same position (or same line), i.e., the scanning lines always coincide with others. Therefore, even if the polygon motor 106 does not rotate exactly integer times during the photosensitive drum 105 rotates one time (or even 1082+¼ times as described above), the scanning lines coincide with others for each color.

In addition, the ITOP signal is always appeared or generated at the same position on the photosensitive drum 105, the phase difference time T0 between the ITOP signal and the BD signal (or FG pulse of polygon motor shown in FIG. 2C) for each color is always constant as shown in FIG. 15.

For this reason, if the image writing starts based on the ITOP signal, the image writing start positions for the first to the N-th colors can be accurately coincided with others, whereby the high-quality image without any color aberration or displacement can be obtained.

In the present embodiment, the number of planes of the polygon mirror is eight and the number of FG pulses per one rotation of the polygon motor is four. However, if the number (x) of FG pulses per one rotation of the polygon motor and the number (y) of planes of the polygon mirror satisfy the relation y=M×x (M is natural number), the same effect as described above can be obtained.

According to the present embodiment, the polygon motor may output the integer number of FG pulses during the photosensitive drum rotates one time. Therefore, the image formation apparatus can be designed on the basis of 1/(the number of FG pulses per one rotation of the polygon motor) rotation unit of the polygon motor (i.e., ¼ rotation unit in the present embodiment), so that a free hand (or degree of freedom) in the designs of the gear ratio of motor, the diameter of photosensitive drum, the number of motor rotation and the like becomes higher.

Especially, in the present embodiment, even in the case where the number of FG pulses per one rotation of the polygon motor does not have a one-to-one correspondence in respect of the number of planes of the polygon mirror, if such the number of FG pulses is 1/(integer corresponding to the number of planes of the polygon mirror), the number of FG pulses to be output may be small. Therefore, even if the number of rotations of the polygon motor becomes higher, the number of FG pulses per one rotation of the polygon mirror may be reduced within the range that the above-described relation or condition is satisfied. For this reason, the FG pulses can be surely output, and also the PLL control can be easily performed.

Further, in the present invention, each driving motor is controlled on the basis of the FG pulses generated by reading the pole patterns. However, the present invention is not restricted to such a method. That is, each driving motor may be controlled, in an another method, on the basis of a control pulse which can obtain the same effect as that obtained by using the FG pulse, i.e., the effect capable of detecting the rotating speed.

Furthermore, it can be obtained the same effect even in a case where the present invention is applied to a photosensitive belt instead of the photosensitive drum. Moreover, it can be obtained the same effect even in a case where the present invention is applied to a method where the color image is formed by superimposing each color on the transfer drum, the transfer belt, the intermediate transfer drum or the intermediate transfer belt, instead of the method of superimposing each image on the photosensitive drum.

Conventionally, in order to coincide the phase of the polygon scanner and the phase of each image support body (i.e., photosensitive body, transfer body) with each other, the rotation of polygon scanner has been controlled by using the BD signal and the reference clock signal. However, in the present embodiment, it is featured that the rotation of polygon scanner is controlled by using the FG pulse and the reference clock signal.

In consideration of such the feature that the polygon scanner can be controlled without use of the BD signal, in the above-described embodiments of the present invention, the generation of laser beam from the semiconductor laser 2 or the like can be temporarily suspended during the rotative phase of the polygon scanner is controlled (by changing the rotating speed of the polygon scanner). Therefore, it can be prevented that the image formation apparatus becomes decrepit or superannuated due to wasteful laser irradiation.

As described above, the image formation apparatus according to the present invention gives a more free hand in designing the number of planes of the polygon motor or the like as compared with the conventional apparatus, and also can surely prevent the positional aberration for each color in the color image formation.

Although the present invention has been described above with respect to the preferred embodiments, the present invention is not restricted to the construction or structure of the above-described embodiments but many modifications and variations are possible within the spirit and scope of the appended claims of the present invention.

What is claimed is:

1. An image formation apparatus which forms a color image by superimposing an image corresponding to each of plural-color image data on an image support body, comprising:

light beam generation means for generating a light beam which has been modulated according to each-color image data included in the plural-color image data;

a rotation polygon mirror for performing scanning on a photosensitive body by using the light beam;

position signal generation means for outputting a position signal representing a scanning position in a scan line of a first color on the photosensitive body, in case of performing the scanning on the photosensitive body by using the light beam corresponding to first-color image data included in the plural-color image data; and control means for controlling rotation driving of said rotation polygon mirror corresponding to second and subsequent colors, in response to the position signal of the first color, such that the image formation positions of the second and subsequent colors on the photosensitive body coincide with the image formation position of the first color.

2. An apparatus according to claim 1, wherein the position signal represents a count value which is used to control a motor for rotatively driving said rotation polygon mirror.

3. An apparatus according to claim 1, wherein said light beam generation means does not generate the light beam during the controlling performed by said control means.

4. An image formation method which forms a color image by superimposing an image corresponding to each of plural-color image data on an image support body, comprising:

a light beam generation step of generating a light beam which has been modulated according to each-color image data included in the plural-color image data;

a scanning step of scanning a photosensitive body by using the light beam, with a rotation polygon mirror;

a position signal generation step of outputting a position signal representing a scanning position in a scan line of a first color on the photosensitive body, in case of scanning on the photosensitive body the light beam corresponding to first-color image data included in the plural-color image data; and a control step of controlling rotation driving of the rotation polygon mirror corresponding to second and subsequent colors, in response to the position signal of the first color, such that the scanning positions of the second and subsequent colors on the photosensitive body coincide with the scanning position of the first color.

5. An image formation apparatus which forms a color image by superimposing an image corresponding to each of plural-color image data on an image support body, comprising:

light beam generation means for generating a light beam which has been modulated according to each-color image data included in the plural-color image data;

a rotation polygon mirror for performing scanning on a photosensitive body by using the light beam;

position signal generation means for outputting a position signal representing a position in a scan line at which the image of a first color is formed on the image support body, in case of forming on the image support body the image corresponding to first-color image data included in the plural-color image data; and control means for controlling rotation driving of said rotation polygon mirror corresponding to second and subsequent colors, in response to the position signal of the first color, such that the image formation positions of the second and subsequent colors on the photosensitive body coincide with the image formation position of the first color.

6. An apparatus according to claim 5, wherein the position signal represents a count value which is used to control a motor for rotatively driving said rotation polygon mirror.

7. An apparatus according to claim 5, wherein the image support body includes the photosensitive body.

8. An apparatus according to claim 5, wherein the image support body includes an intermediate transfer body.

9. An apparatus according to claim 5, wherein the image support body includes a paper on a transfer body.

10. An image formation method which forms a color image by superimposing an image corresponding to each of plural-color image data on an image support body, comprising:

a light beam generation step of generating a light beam which has been modulated according to each-color image data included in the plural-color image data;

a scanning step of scanning a photosensitive body by using the light beam, with a rotation polygon mirror;

a position signal generation step of outputting a position signal representing a position in a scan line at which the image of a first color is formed on the image support body, in case of forming on the image support body the image corresponding to first-color image data included in the plural-color image data; and a control step of controlling rotation driving of the rotation polygon mirror corresponding to second and subsequent colors, in response to the position signal of the first color, such that the image formation positions of the second and subsequent colors on the photosensitive body coincide with the image formation position of the first color.

11. An image formation apparatus comprising:

light beam generating means for generating a light beam which has been modulated according to image data;

a rotation polygon mirror having n reflection planes, for performing scanning on a photosensitive body by reflecting the light beam with rotation;

rotation pulse generation means for detecting the light beam scanning the photosensitive body at a predetermined position, and for generating a pulse based on a detection signal of the light beam during which said rotation polygon mirror rotates one time;

clock generation means for generating a reference clock used for controlling a phase of said rotation polygon mirror, on the basis of a position in a scan line of the photosensitive body; and control means for controlling the rotation of said rotation polygon mirror on the basis of the pulse generated by said rotation pulse generation means and the reference clock generated by said clock generation means.

12. An apparatus according to claim 11, wherein said clock generation means is reset when the photosensitive body reaches a predetermined position.

13. An apparatus according to claim 11, wherein the n reflection planes and the m pulses satisfy relation n=N×m (N is natural number).

14. An apparatus according to claim 11, wherein said light beam generation means does not generate the light beam during the controlling performed by said control means.

15. An image formation method comprising the steps of:

generating a light beam which has been modulated according to image data;

performing scanning on a photosensitive body by reflecting the light beam with rotation of a rotation polygon mirror having n reflection planes;

detecting the light beam scanning the photosensitive body at a predetermined position;

generating a pulse based on a detection signal of the light beam during which the rotation polygon mirror rotates one time;

generating a reference clock used for controlling a phase of the rotation polygon mirror, on the basis of a position in a scan line of the photosensitive body; and controlling the rotation of the rotation polygon mirror on the basis of the pulse generated in said rotation pulse generation step and the reference clock generated in said clock generation step.

* * * * *

UNITED STATES PATENT AND TRADEMARK OFFICE
CERTIFICATE OF CORRECTION

PATENT NO. : 6,151,053
DATED : November 21, 2000
INVENTOR(S) : Watanabe et al.

It is certified that error appears in the above-identified patent and that said Letters Patent is hereby corrected as shown below:

Abstract,
Line 1, "It" should read -- There --;
Line 4, "comprises" should read -- comprising --; and
Line 16, "it" should read -- there --.

Column 1,
Lines 12 and 62, "it" should read -- there --.

Column 2,
Line 4, "it has been occurred" should read -- there has occurred --;
Line 44, "An another" should read -- Another --;
Line 54, "it" should read -- there --; and
Line 63, "during" should read -- during which --.

Column 3,
Line 30, "during" should read -- during which --.

Column 6,
Line 40, "it" should read -- there --; and
Line 42, "colors," should read -- color, --.

Column 10,
Line 28, "during" should read -- during which --.

Signed and Sealed this

Eighth Day of January, 2002

Attest:

*Attesting Officer*

NICHOLAS P. GODICI
*Acting Director of the United States Patent and Trademark Office*